United States Patent
Maeda et al.

(10) Patent No.: US 9,910,488 B2
(45) Date of Patent: Mar. 6, 2018

(54) MOTION GUIDE PRESENTATION METHOD AND SYSTEM THEREFOR, AND MOTION GUIDE PRESENTATION DEVICE

(71) Applicant: JAPAN SCIENCE AND TECHNOLOGY AGENCY, Saitama (JP)

(72) Inventors: Taro Maeda, Osaka (JP); Hideyuki Ando, Osaka (JP); Hiroyuki Izuka, Osaka (JP); Tomoko Yonemura, Osaka (JP); Daisuke Kondo, Osaka (JP); Takumi Yokosaka, Osaka (JP)

(73) Assignee: Japan Science and Technology Agency (JP)

( * ) Notice: Subject to any disclaimer, the term of this patent is extended or adjusted under 35 U.S.C. 154(b) by 442 days.

(21) Appl. No.: 14/395,969

(22) PCT Filed: Apr. 18, 2013

(86) PCT No.: PCT/JP2013/061475
§ 371 (c)(1),
(2) Date: Oct. 21, 2014

(87) PCT Pub. No.: WO2013/161662
PCT Pub. Date: Oct. 31, 2013

(65) Prior Publication Data
US 2015/0109187 A1    Apr. 23, 2015

(30) Foreign Application Priority Data
Apr. 23, 2012  (JP) ................................ 2012-097328

(51) Int. Cl.
*G06F 3/01* (2006.01)
*H04N 13/04* (2006.01)
(Continued)

(52) U.S. Cl.
CPC ............ *G06F 3/011* (2013.01); *G02B 27/017* (2013.01); *G06F 3/14* (2013.01); *G09G 3/003* (2013.01);
(Continued)

(58) Field of Classification Search
None
See application file for complete search history.

(56) References Cited

U.S. PATENT DOCUMENTS

| | | | |
|---|---|---|---|
| 2010/0295921 A1* | 11/2010 | Guthrie | G06F 3/011 348/14.08 |
| 2011/0007171 A1* | 1/2011 | Okumura | G06T 1/0085 348/211.4 |
| 2011/0128364 A1 | 6/2011 | Ono | |

FOREIGN PATENT DOCUMENTS

| | | |
|---|---|---|
| EP | 1 739 642 | 1/2007 |
| JP | 2005-034195 | 2/2005 |

(Continued)

OTHER PUBLICATIONS

Brain Communications—communication means for brains and society (in Japanese), Chapter 7, Physical information applied technology (in Japanese), Taro Maeda, edited by the Institute of Electronics, Information and Communication Engineers, Japan, the Institute of Electronics, Information and Communication Engineers, Japan, 2011. p. 190-233.

(Continued)

*Primary Examiner* — Stephen Sherman
*Assistant Examiner* — Andre Matthews
(74) *Attorney, Agent, or Firm* — Jordan and Koda, PLLC

(57) ABSTRACT

A motion guide display device includes a head-mountable image display device that displays an image, a camera that takes a self image from a first person perspective, an image display processing unit that displays a reference image from a first person perspective as a following target and the self (Continued)

image at the display unit alternately in a time-dividing manner under the condition generating a blending feeling, and a display mode setting unit that lets the image display processing unit operate within the range of cycles (frequencies) and self-other ratios as the condition generating a blending feeling. This can bring the blending feeling with the reference image, and can support the continuation of spontaneous following motion.

9 Claims, 29 Drawing Sheets

(51) Int. Cl.
  *H04N 13/02* (2006.01)
  *G09G 5/36* (2006.01)
  *G09G 3/00* (2006.01)
  *G02B 27/01* (2006.01)
  *G06F 3/14* (2006.01)

(52) U.S. Cl.
  CPC ........... *G09G 5/36* (2013.01); *H04N 13/0239* (2013.01); *H04N 13/044* (2013.01); *G02B 2027/014* (2013.01); *G02B 2027/0187* (2013.01); *G09G 2354/00* (2013.01)

(56) References Cited

FOREIGN PATENT DOCUMENTS

| | | |
|---|---|---|
| JP | 2010240185 | 10/2010 |
| JP | 2010-257081 | 11/2010 |

OTHER PUBLICATIONS

The Skill motion presentation technique integrating expert's viewpoint with learner's viewpoint, proceedings of the Symposium of Information Processing Society of Japan, p. 303-306, 2011.

Improvement of Wearable View Sharing System for Skill Training, Yuki Hashimoto, et al, Osaka University, The 21st International Conference on Artificial Reality and Telexistence, Nov. 25-20, 2011—pp. 104-109.

Collaboration and Skill Transmission by First-person Perspective View Sharing System, Hiroki Kawasaki, et al, 19th IEEE International Symposium on Robot and Human Interactive Communication, Sep. 12-15, 2010—pp. 125-131.

* cited by examiner

13  B  A

13  B

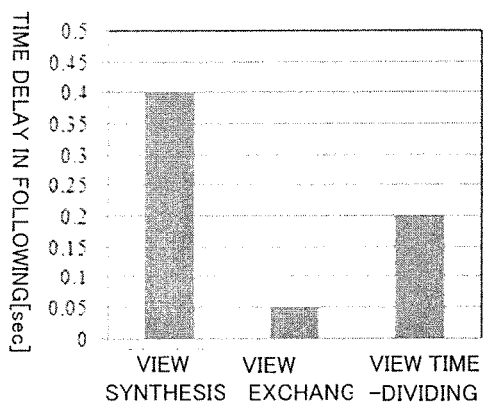
Fig.5A POSITION FOLLOWING
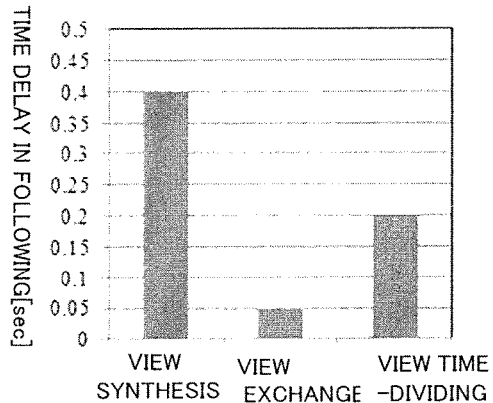
Fig.5D VELOCITY FOLLOWING
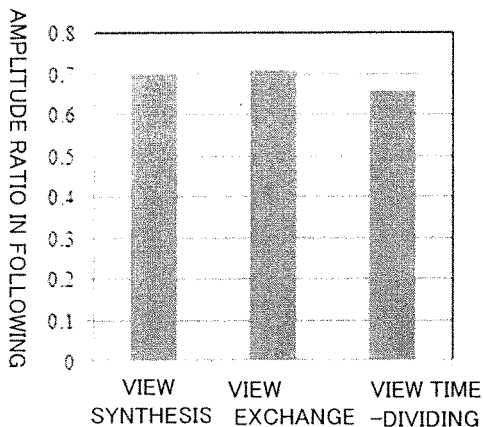
Fig.5B POSITION FOLLOWING
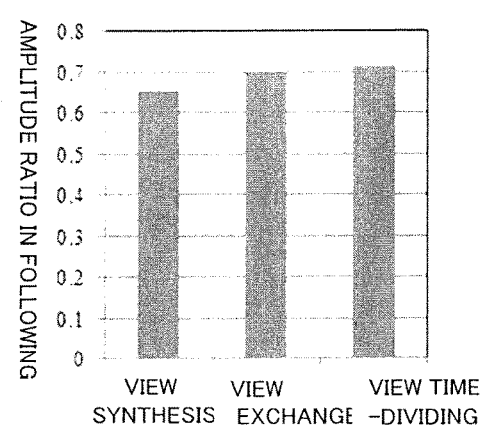
Fig.5E VELOCITY FOLLOWING
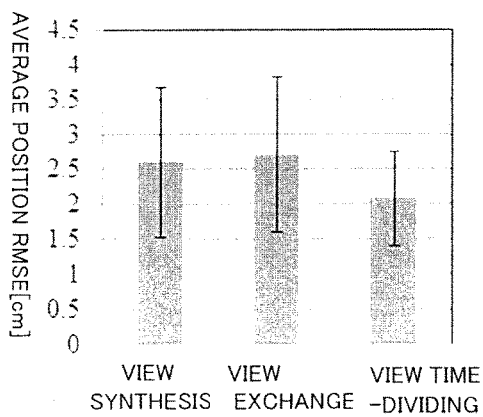
Fig.5C POSITION OLLOWING
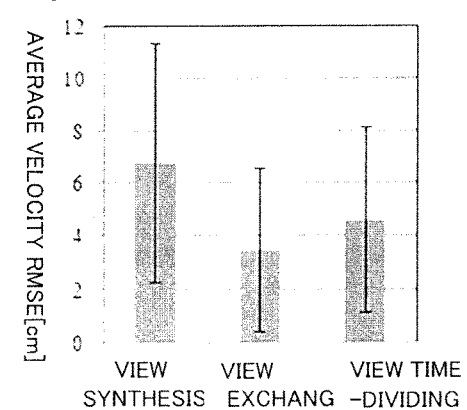
Fig.5F VELOCITY FOLLOWING

FOLLOWING POSITION ERROR
THUMB

FOLLOWING VELOCITY ERROR
THUMB

FOLLOWING POSITION ERROR
MIDDLE FINGER

FOLLOWING VELOCITY ERROR
MIDDLE FINGER

Fig.15A

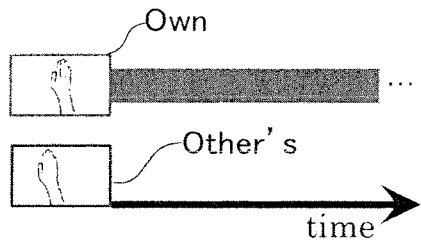

'Only Self' condition

Fig.15B

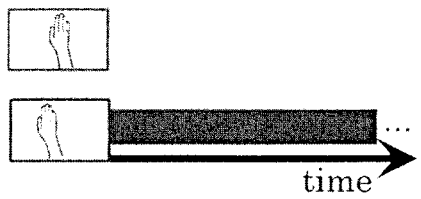

'Only The Other's' condition

Fig.15C

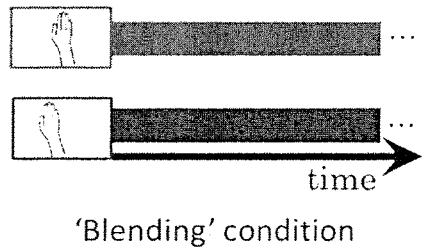

'Blending' condition

Fig.15D

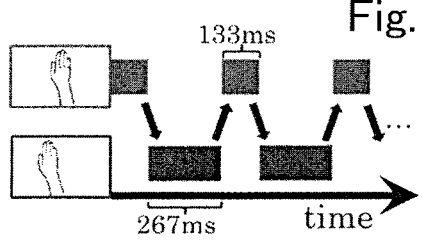

'Switching' condition

Experimental conditions of displaying own and the other's movements (a) SELF: SELF UPPER LIMB MOTION ONLY CAN BE OBSERVED
(b) OTHER: OTHER UPPER LIMB MOTION ONLY CAN BE OBSERVED
(c) SYNTHESIS: MOTIONS OF SELF AND OTHER UPPER LIMBS CAN BE OBSERVED CONCURRENTLY
(d) TIME-DIVIDING: SELF-OTHER UPPER LIMBS MOTIONS CAN BE ALTERNATELY (HIGH-SPEED SWITCHING) OBSERVED X-DIRECTION DISPLACEMENT FROM VISUAL TARGET [mm]

RESULT OF MULTIPLE COMPARISON BASED ON TUKEY-KRAMER METHOD IN VIEW PRESENTATION CONDITIONS

BLENDING FEELING OCCURRENCE
RANGE BASED ON INTROSPECTION

REACHING MOTION
STARTING POSITION

RELATIONSHIP OF GAINS AND CYCLE 400 msec, SELF-OTHER VIEW SWITCHING RATIO 1:2

RELATIONSHIP OF GAINS AND CYCLE 400 msec, SELF-OTHER VIEW SWITCHING RATIO 1:1

RELATIONSHIP OF GAINS AND CYCLE 400 msec, SELF-OTHER VIEW SWITCHING RATIO 2:1

OCCURRENCE FREQUENCY OF DELAY IN
EACH VIEW CONDITION

Fig.27A
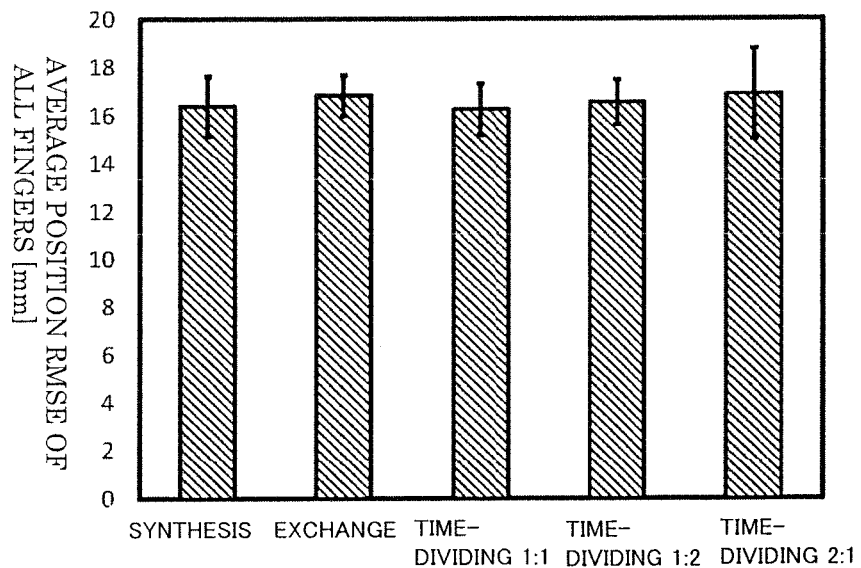
AVERAGE POSITION RMSE OF ALL FIVE FINGERS:
ERROR BAR IS STANDARD DEVIATION
Fig.27B  $*: p < .05$   $: p < .0001$   $*: p < .00001$
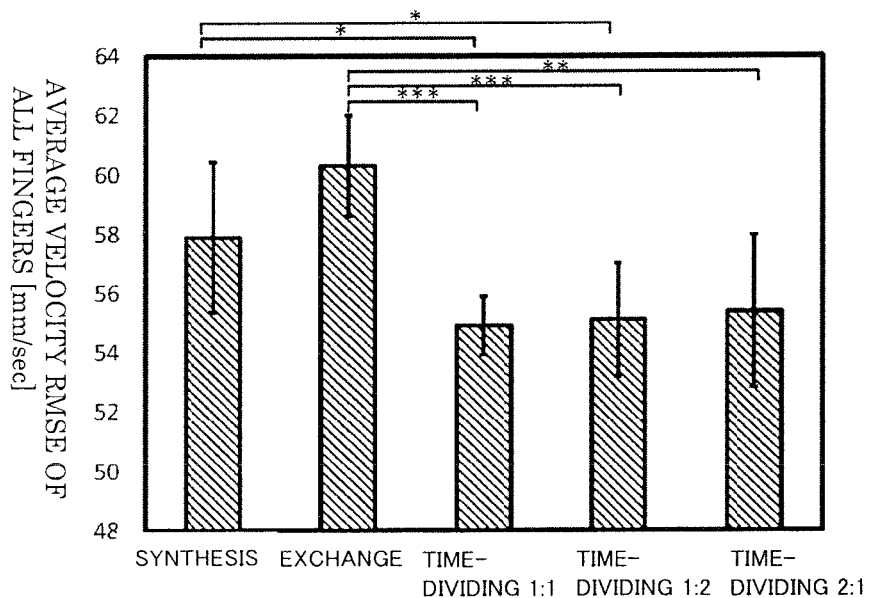
AVERAGE VELOCITY RMSE OF ALL FIVE FINGERS:
ERROR BAR IS STANDARD DEVIATION FOLLOWING POSITION ERROR VS TIME PARAMETERS
DURING OTHER MOTION FOLLOWING EXPERIMENT FOLLOWING VELOCITY ERROR VS TIME PARAMETERS
DURING OTHER MOTION FOLLOWING EXPERIMENT

MOTION GUIDE PRESENTATION METHOD AND SYSTEM THEREFOR, AND MOTION GUIDE PRESENTATION DEVICE

TECHNICAL FIELD

The present invention relates to techniques to present a reference image as a following target and a self-image of a user at a presentation member both from a first person perspective, and to guide the user to perform a motion to follow the following target.

BACKGROUND OF THE INVENTION

A video see-through head mounted display (VST-HMD) is known as a device to realize a visual guidance of a physical motion. A VST-HMD is typically configured to display video from a first person perspective at a display screen mounted at a head, and when two persons including a wearer and another person as a model sharing the view in the display screen perform a cooperative physical motion, first-person perspective videos of the other person and the wearer are synthesized at the same time for presentation for learning of the physical motion and cooperation thereof (Non-Patent Literature 1). Non-Patent Literature 2 discloses an image processing technique to use skeletal animation as guidance video on the expert side, configured to convert this skeletal animation into a first person perspective video to be shared with the wearer's perspective image for synthesized display.

CITATION LIST

Non-Patent Literatures

Non-Patent Literature 1: Brain Communications—communication means for brains and society (in Japanese), Chapter 7, Physical information applied technology (in Japanese), Taro MAEDA, edited by the Institute of Electronics, Information and Communication Engineers, Japan, the Institute of Electronics, Information and Communication Engineers, Japan, 2011

Non-Patent Literature 2: The Skill motion presentation technique integrating expert's viewpoint with learner's viewpoint, proceedings of the Symposium of Information Processing Society of Japan, P. 303-306, 2011

SUMMARY OF THE INVENTION

To follow another person's motion, a person performing a physical motion has to recognize a positional error at corresponding points with the other person at the physical parts of these two persons presented in the view and continue the motion so as to decrease the positional error, i.e., to perform a following motion. However, if such corresponding points are in a complicated state as in the following motion as with ten fingers, for example, the following motion has to be performed while directing the attention back and forth between the two person's perspective videos. In such a case, burdens on the person simply due to the recognition of the positional error between the corresponding points become too large, which makes the following motion difficult and often causes the person to lose the sense of immersion of a cooperative motion.

Then the present invention provides a technique of presenting a self image and a reference image both from a first person perspective alternately in a time-dividing manner at a predetermined cycle and ratio, thus achieving guidance with high following accuracy.

A motion guide presentation method according to the present invention presents a reference image as a following target as well as a self image of a user at a presentation member, and guides the user to follow a motion in the reference image. The reference image and the self image both from a first person perspective are presented alternately in a time-dividing manner at the presentation member under a predetermined condition, the predetermined condition including a frequency of the time-dividing presentation and a ratio of presentation time between the self image and the reference image.

A motion guide presentation device according to the present invention includes: a common presentation member that presents a reference image as a following target as well as the self image of a user both from a first person perspective; presentation processing means configured to present the reference image and the self image alternately in a time-dividing manner at the presentation member under a predetermined condition; and presentation mode setting means configured to let the presentation processing means operate at a frequency of the time-dividing presentation and a ratio of presentation time between the self image and the reference image as the predetermined condition.

With these configurations, the self image from a first person perspective and the reference image as a following target from a first person perspective are presented alternately in a time-dividing manner at the common presentation member. The time-dividing presentation is performed at a predetermined frequency and a predetermined ratio, which can achieve precise following ability compared with the view synthesis method and the view exchange method. The following ability includes a decrease in the following velocity error and the following position error. When two persons including another person as the reference image (in the case of a recorded image, this includes an image of the other person as well as the user) and the user perform a cooperative physical motion, the reference image and the self image are switched under the predetermined condition, whereby the user does not lose the voluntariness of the self motion and performs a motion naturally to follow the other person's motion, i.e., the user can feel the illusion as if physical parts of the two persons that are displayed successively in the view were blended into the one and self motion part, (generation of the blend feeling). As a result, the user can execute simultaneous matching of multiple corresponding points unintentionally, which is difficult to execute intentionally, and so can continue the following motion spontaneously while reducing a burden of cognition on the behavior. When the reference image shows a motion of an instructor or the like, the motion of a highly-skilled expert, instructor or the like can be conveyed to an operator on the site, for example, to let the operator easily follow the motion precisely. This can be applied to the embodiment configured so that both sides follow images taken by both sides as reference images to have a cooperative relationship.

A motion guide presentation system according to the present invention includes a first and a second motion guide presentation devices as the motion guide presentation device, and a communication unit to perform transmission and reception of images taken mutually between the first and the second motion guide presentation devices. This can provide a very effective remote cooperation supporting system that brings the blending feeling in real time, and can facilitate the induction of natural following motion. This can be applied to the embodiment configured so that both sides follow images taken by both sides as reference images to have a cooperative relationship.

The present invention can bring the blending feeling with a reference image, and can support the continuation of spontaneous following motion.

BRIEF DESCRIPTION OF THE DRAWINGS

FIG. 4 illustrates screens to describe the types of display modes, where

FIG. 5 shows charts to describe results of experiments to evaluate the following ability to motions of repeatedly opening/closing fingers among the display modes, where FIG. 5A to 5C shows the evaluation of following ability for position, and FIG. 5D to 5F shows the evaluation of following ability for velocity.

FIG. 13 includes charts to describe analysis results of the experiment when the cycle is a parameter, where

FIG. 14 includes charts to describe analysis results of the experiment when the ratio is a parameter, where

FIG. 15 describes various view presentation conditions in an experiment where an examinee shakes his/her upper limb left and right, where FIG. 15A is a display mode of the self view method, FIG. 15B is a view exchanging method, FIG. 15C is a view synthesis method, and FIG. 15D is a view time-dividing method.

FIG. 17 describes the procedure in Experiment IV and its result, where

FIG. 22 describes the relationship of the blending feeling and the displacement of the reaching motion starting position based on introspection, where

FIG. 24 illustrates the relationship between three conditions for view time-dividing presentation and the following gains obtained as a result of the analysis, where

FIG. 27 includes charts showing the following error of the five-finger random bending and stretching motion in each display mode, where FIG. 27A shows the position RMSE, and FIG. 27B shows the velocity RMSE.

DESCRIPTION OF THE PREFERRED EMBODIMENTS

Figure 1:
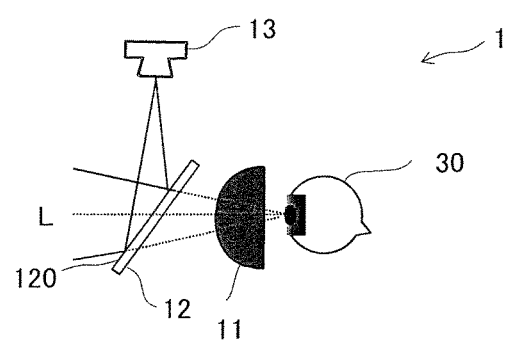
FIG. 1 describes the schematic configuration of a display unit of a motion guide display device that is one embodiment.
Figure 2:
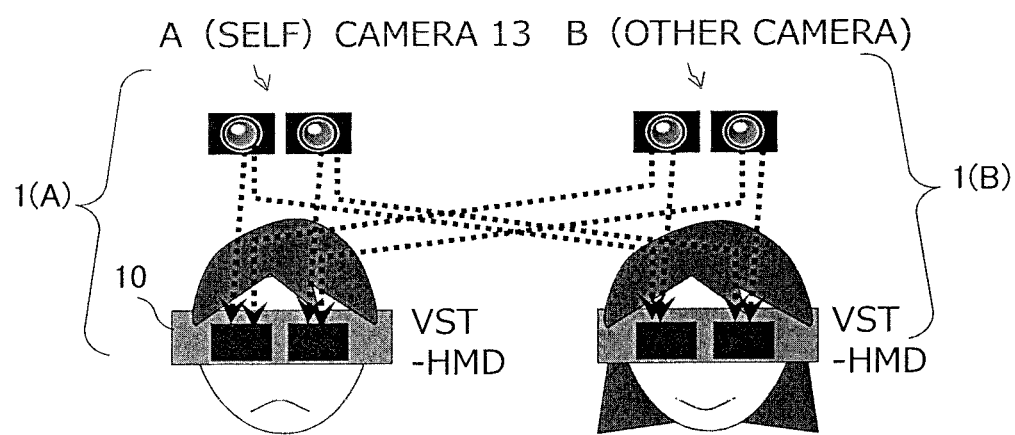
FIG. 2 describes the schematic configuration of a motion guide display system that is one embodiment.
Figure 3:
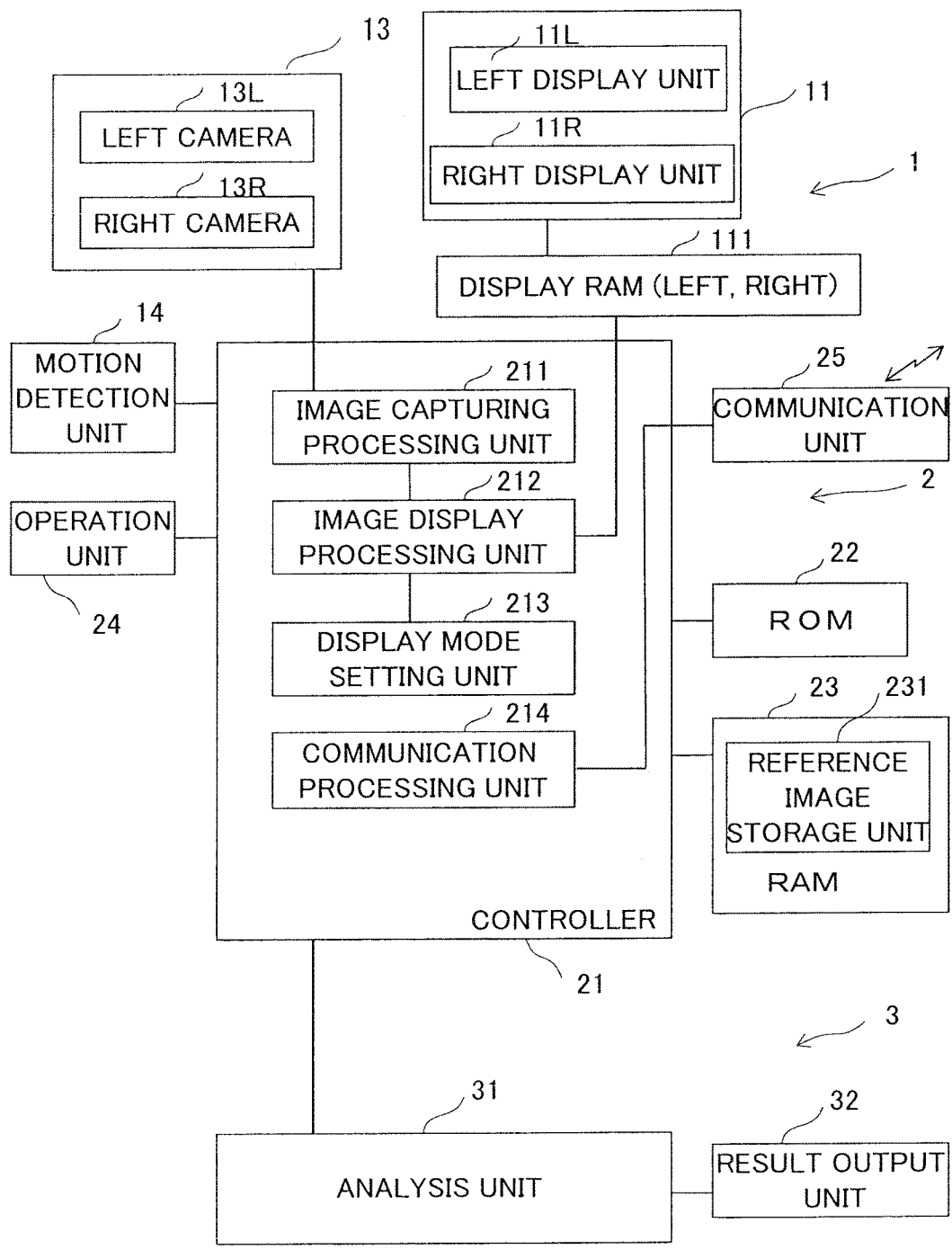
FIG. 3 is a functional block diagram that is one embodiment of the motion guide display device.

FIG. 1 describes the schematic configuration of a display unit of a motion guide display device that is one embodiment, FIG. 2 describes the schematic configuration of a motion guide display system that is one embodiment, and FIG. 3 is a functional block diagram that is one embodiment of the motion guide display device.

A motion guide display device includes a video see-through head mounted display (hereinafter called a VST-HMD) as a display unit, which is typically mounted at a head of a user and is to present an image in front of the eyes, and a processing device 2 that processes information exchanged with the VST-HMD 1. The VST-HMD 1 includes a frame member 10 (see FIG. 2) that is disposed in front of left and right eyes, and this frame member 10 includes an image display device 11 that displays an image, a mirror 12 as an example of an optical system and a camera 13 as imaging means as illustrated in FIG. 1. The frame member 10 includes, at an appropriate position, a motion detection unit 14 that detects the motion of the camera 13 as an equivalent motion of visual lines of the user who is wearing the VST-HMD 1. Although not illustrated in FIGS. 1 and 2, the frame member 10 includes a fastening member that allows the frame member 10 to be mounted at a head part of the wearer in a fixed or stable manner, such as a belt.

The image display device 11 is attached to the frame number 10 so that its display face is opposed to the left and right eyes when the wearer wears the frame member 10 at the head. The mirror 12 and the camera 13 are attached on the front-face side of the image display device 11. The image display device 11 may be a liquid crystal display panel, an organic EL display panel, a plasma display panel or the like. The axis L in FIG. 1 indicates the direction of the normal-line of the display face of the image display device 11. The image display device 11 displays an image on the wearer-side taken by the camera 13 or another image received from an external device as described later.

As illustrated in FIG. 1, the mirror 12 is disposed obliquely to the axis L, and has a mirror face 120 on the front side (left in FIG. 1). The camera 13 is fixed to the frame member 10 while keeping the orientation so that the view is directed to the mirror face 120 of the mirror 12. The camera 13 is configured so that the optical axis of the camera is refracted by the mirror face 120 of the mirror 12 to be directed forward and so agree with the axis L of the normal line of the display face of the image display device 11. In this way, the axis L of the display face of the image display device 11 and the optical axis of the camera 13 agree, whereby an image taken from a first person perspective can be displayed at the image display device 11. Herein, the first person perspective refers to a camera position, from which an image that is similar to a view as if it were observed from the wearer's eyes can be taken. The camera 13 is preferably disposed at an optical conjugate position with the display face of the image display device 11 by adjusting the distance from the mirror 12. This enables the same image as the view which would be observed with the eyes of the person wearing the VST-HMD 1 to be displayed at the image display device 11. The mirror 12 may be another optical system such as a prism or a lens.

The present embodiment includes the image display device 11, the mirror 12 and the camera 13 as the display unit of the motion guide display device, and is configured to take an image of a physical part of the wearer (e.g. a wrist) with the camera 13 and display an image taken at the image display device 11. The configuration of the display unit is not limited to the embodiment of FIG. 1, which may have various configurations as described later. For example, the display part may be configured as another embodiment (similarly an optical see-through HMD described later) such that the wearer's physical part may be presented as an optical image. In this way, the presentation means of the present invention is an umbrella term of an embodiment of displaying an image taken by a camera, and an embodiment of displaying an optical image, and the embodiment of FIG. 1 includes the VST-HMD 1 coming with the camera 13 as the display unit.

In FIG. 3, the motion detection unit 14 detects the position and orientation of the camera 13 continuously. The position and orientation refers to coordinates and direction (viewing point and viewing line of the camera 13) in a space where the wearer exists. When an image taken by the camera 13 only is displayed at the image display device 11, the position and orientation data of the camera 13 is not required especially. However, when an image of another person also is displayed in an image taken, the position and orientation data detected of the camera 13 is used, whereby the viewing lines of the wearer and the other person can be combined. The motion detection unit 14 may be a well-known device, which is configured to detect a magnetic signal for each of three axes generated from a magnetic generator not illustrated that is disposed at an appropriate position, and so detect the three-dimensional position and direction. Alternatively it may be a three-dimensional acceleration sensor, or may be a monitor camera disposed at a high position enabling bird's eye observation of the wearer, based on an image of which the position and direction of the camera 13 may be detected.

The processing device 2 includes a controller 21 made up of a CPU (Central Processing Unit). The controller 21 is connected to a ROM (Read Only Memory) 22, a PAM (Random Access Memory) 23, an operation unit 24 and a communication unit 25. The ROM 22 stores a program to control the operation of the VST-HMD 1 and a program to process information exchanged with the VST-HMD 1 (hereinafter they may be referred to as a control program collectively) as well as various given data. The PAM 23 stores data being processed temporarily, and includes a reference image storage unit 231 to store a reference image described later.

The operation unit 24 is to issue various instructions, and the embodiment of the processing device 2 that is a personal computer, for example, may include icons and buttons on the screen, a keyboard, a mouse or the like. The communication unit 25 may be of a wired or wireless type. The communication unit 25 is to, with a VST-HMD 1 (B) of another image display device that another person (B) is wearing, transmit and receive information on images taken by their cameras as illustrated in FIG. 2.

The controller 21 functions as an image capturing processing unit 211 that captures an image (as a motion image) taken by the camera 13 (left camera 13L and right camera 13R) continuously, an image display processing unit 212 that creates image data to be displayed at the image display device 11 (left display unit 11L and right display unit 11R), a display mode setting unit 213 that instructs the image display processing unit 212 to create an image in a mode in accordance with the set display mode, and a communication processing unit 214 to enable data exchange with an external device via the communication unit 25, which are performed based on the execution of the control program stored in the ROM 22, the control program being read to the RAM 23 before the operation and being executed by the CPU. A display RAM 111 for left and right stores an image created by the image display processing unit 212 written thereon, which reads repeatedly at a predetermined frame cycle (e.g., 60 Hz).

The VST-HMD 1 can be applied variously. In one exemplary application, as illustrated in FIG. 2, two VST-HMDs 1 are connected via the communication unit 25, where one VST-HMD 1(A) is on the operator side as the wearer (A) and the other VST-HMD 1(B) is on the instructor side as another person (B). Then, an image taken by the camera 13 of the other person (B) is displayed on the image display device 11 of the wearer (A) for a following motion to the instructor's motion (for imitation or learning). In this case, a mode to display an image taken by the camera 13 of the wearer (A) and an image taken by the camera 13 on the other person (B) at the VST-HMD 1(A) on the wearer (A) side may be devised, whereby a guidance method having better following ability may be found. Then, various experiments for comparison and verification were conducted for such a display mode. The display modes attempted in the following experiments include display manners based on different display modes and display manners based on different display cycles (frequencies) and different ratios between display durations of the wearer's and the other person's images (cycle, called a ratio parameter) in a predetermined one display mode.

<Experiment I>

Display modes are described first.

Figure 4A:
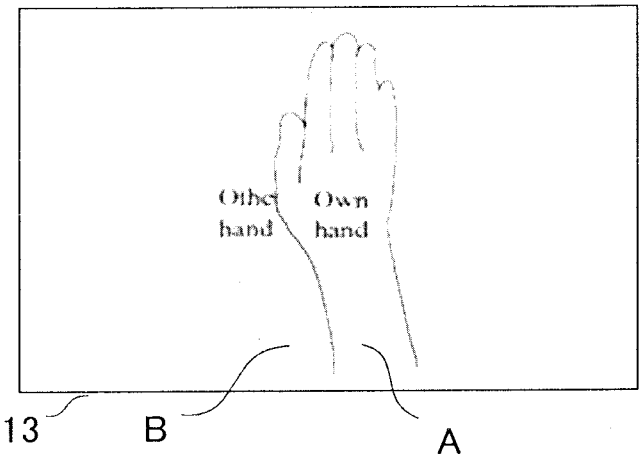
FIG. 4A shows a view synthesis method.
Figure 4B:
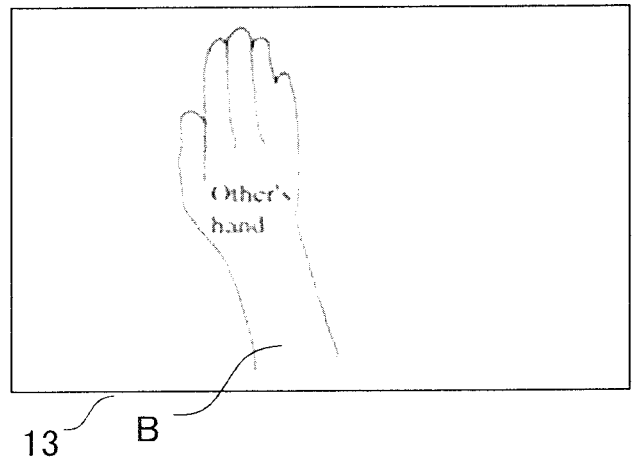
FIG. 4B shows a view exchange method.

FIG. 4 describes the types of display modes, where FIG. 4A shows a view synthesis method to synthesize an image taken by a camera of the wearer as an examinee and an image taken by a camera of another person, and FIG. 4B shows a view exchange method to display an image taken by a camera of another person only. The experiments includes a view time-dividing method (see FIG. 7) as well that displays an image taken by a camera of the wearer and an image taken by a camera of another person alternately in a time-sharing manner. In this way, the view synthesis method, the view exchange method and the view time-dividing method are selected in this experiment as the types of display modes for experimental targets.

The experiment was performed so that an image of a repeated opening/closing motion of fingers by the other person (B) was displayed at the image display device 11 of the VST-HMD 1 (A) of the wearer (A) in each display mode of the view synthesis a method, the view exchange method and the view time-dividing method, and the wearer (A) was asked to imitate the motion while viewing the image displayed on the image display device 11. The image of the other person (B) used was an image recorded beforehand and stored in the reference image storage unit 231. The display mode setting unit 213 functions as a unit to switch the display modes in this experiment about the display modes. In the view time-dividing method, images on both sides are switched at a predetermined cycle and self-other ratio, and the experiment was performed under the condition of at the cycle of 300 ms (3.3 Hz) and the self-other ratio of 1:3.

In FIG. 3, an analyzer 3 includes an analysis unit 31 and a result output unit 32. The analysis unit 31 can make an analysis by various methods. In the present embodiment, the analysis unit 31 is configured to make an analysis of an image of the motion of opening/closing of the wearer's (A) fingers taken by the camera 13 and the motion of opening/closing of fingers on the reference image, and to compare the motions of the opening/closing of fingers of both from the analysis result, i.e., evaluate the following ability (see FIGS. 5A to 5F).

To begin with, the following describes one example of the method to analyze a motion by the analysis unit 31. A finger image only is extracted from an image taken by the camera 13 by setting a predetermined threshold in the brightness direction so as to remove an image of a background area. For instance, a predetermined difference in illuminance can be obtained by irradiating a finger part with light, for example. Then, the number of pixels of the extracted finger image is calculated, and the number of pixels is compared with the actual space distance so that the amount of (actual) movement in the actual space is calculated from the amount of movement in the image. The actual space distance may be calculated by disposing a ruler having a known length on a background image taken by the camera 13, and converting the number of pixels in the length direction of the image of the ruler into the actual distance.

In the self image and the reference image, the amount of movement of fingers are calculated at intervals of 16.7 ms (1/60 Hz) or shorter, for example, and the velocity thereof is calculated. The amount of movement in this case is calculated as information on a position from a predetermined position as a reference point. The amount of movement and the velocity may not be calculated automatically. Then, elements for evaluation of the following ability of the self motion to the reference motion are found for the thus calculated amount of movement and velocity. The evaluation elements used in this experiment were time delay of the following motion, an amplitude ratio of the following motion, and an error in following motion.

FIG. 5 shows charts to describe results of experiment to evaluate the following ability to motions of repeated opening/closing fingers among the display modes. FIG. 5A to 5C shows the evaluation of following ability for position, and FIG. 5D to 5F shows the evaluation of following ability for velocity, where the charts on both sides show time delay in following motion, an amplitude ratio of the following motion and an error in the following motion in the order from the top. The vertical axis of FIG. 5A, 50 has the maximum value of 0.5 second on the scale, and the vertical axis of FIG. 5B, 5E has the maximum value of 0.8 on the scale, the vertical axis of the FIG. 5C has the maximum value of 4.5 cm on the scale, and the vertical axis of the FIG. 5F has the maximum value of 12 cm per second on the scale. "RMSE" on the vertical axes of FIG. 5C, 5F denotes Root Mean Square Error, meaning an error. The same goes for the vertical axes of FIGS. 13 and 14 described later.

FIG. 5 shows that the view exchange method was excellent for the time delay in the following motion for position and velocity (FIG. 5A, 5D). However, as for the error in the following motion for position (FIG. 5C) that is the most important factor for the following motion, a favorable characteristic having the minimum error was obtained from the view time-dividing method. The view time-dividing method showed other characteristics including an error in following motion for velocity (FIG. 5F) and an amplitude ratio in following motion for position and velocity (FIG. 5B, 5E) that are equivalent to those of the view exchange method. These results support that the following ability in the view synthesis method is degraded greatly because the examinee has to perform the motion for matching of images of finger shapes intentionally, and that a failure in such matching leads to insufficient position accuracy of the view exchange method. On the other hand, the view time-dividing method can be evaluated as successfully avoiding of such problems.

In other words, the view time-dividing method can induce, during the mutually cooperative physical motion, a motion where the wearer does not lose the voluntariness of the self motion and performs a motion naturally to follow the other person's motion because the images from the first person perspectives of the two persons (the other person (including recorded image) and the wearer) are alternately switched on its own image display device 11. Then, in order to follow the other person's motion, the wearer can feel the illusion as if blended motion parts on both sides that are displayed successively in the view were the one and self motion part, i.e., the blend feeling can be brought (generated). The blend feeling refers to an impression such that the motion part on the wearer side moves spontaneously or moves as the wearer intends, and voluntariness and involuntariness are blended. In other words, the wearer can have a subjective feeling such that the motion part of the other person seems not as the other person's motion part but nothing except for its own motion part. As a result, the wearer presumably can execute matching of multiple points and the following motion unconsciously while the wearer does not or cannot recognize the following error clearly. On the other hand, in the case of the view synthesis method, images of the views on the two persons are observed at the same time, requiring the wearer to check multiple corresponding points, thus imposing burdens on the wearer and not inducing the motion. The view exchange method also does not induce the motion.

<Experiment II>

Next, another experiment was performed for the view time-dividing method (hereinafter simply called a time-dividing method) to examine a change of such blending property and following accuracy as well as their tendency while changing the cycle (frequency) and the ratio (parameters) of the time-dividing switching of the self-other images. The display mode setting unit 213 is to receive an instruction from the operation unit 24 and set these parameters (cycle (frequency) and ratio).

In this experiment, the reference image is an image including the other person (B) repeatedly moving the wrist to left and right in a reciprocal manner, which is stored in the reference image storage unit 231. The distance and the cycle of the reciprocal movement of the wrist to left and right in the reference image can be set appropriately. In this example, the distance of the reciprocal movement was about 6.5 cm×2, and the cycle of the reciprocal movement was about 2 Hz.

Figure 6:
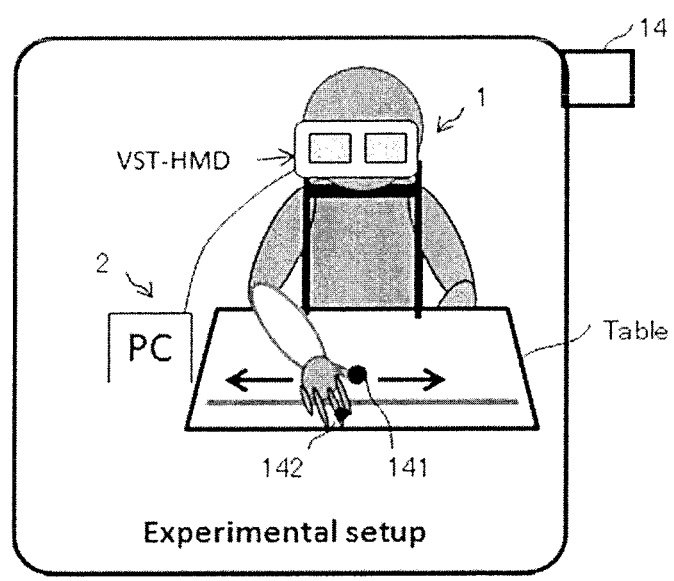
FIG. 6 describes the experiment for evaluation of the following ability to the repeated reciprocal motion of the wrist to the left and right.

FIG. 6 describes the experiment for evaluation of the following ability to the repeated reciprocal motion of the wrist to left and right. The wearer (A) wearing the VST-HMD 1 as an examinee performed the following motion of shaking the wrist to left and right as indicated in the arrow in the drawing on the table as a background. The reference image and the view image of the wearer (A) were displayed at the image display device 11 of the VST-HMD 1 at a predetermined cycle and such a ratio. Magnetic sensors 141 and 142 were attached at appropriate positions of the motion part of the wearer (A), in FIG. 6, at the thumb and the middle finger. The magnetic sensors 141 and 142 are used when magnetic is used as the detection medium at the motion detection unit 14. The magnetic sensors 141 and 142 are detect by the motion detection unit 14 as the position and direction in the three-dimensional space based on the level of voltage that is induced due to magnetic field successively generated corresponding to each axis on the three-dimensional axes. The position (as needed in this experiment) and the direction of the thumb and the middle finger of the wearer (A) can be continuously detected by the motion detection unit 14 and magnetic sensors 141 and 142.

Since the image display device 11 of the present embodiment had a frame cycle at 60 Hz, the experiment was performed while setting the cycle as well as the ratio for every integral multiple of 16.7 ms (1/60 Hz), which may be set at appropriate cycle and ratio depending on the specifications of the frame cycle of the image display device 11. In this experiment, the cycle may be represented with the number of frames. For instance, the time 16.7 ms (1/60 Hz) is equivalent to one frame.

Figure 7:
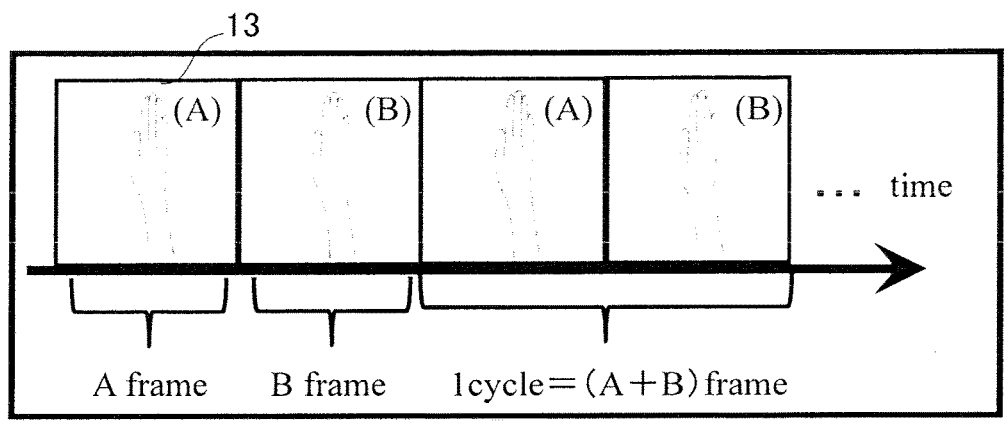
FIG. 7 describes the switching of images in the time-dividing method.

FIG. 7 describes the switching of images in the time-dividing method. In FIG. 7, the display time of the image (A) of the wearer (A) is represented as the number of frames A, the display time of the reference image (B) is represented as the number of frames B, and the cycle is represented as the number of frames (A+B).

Figure 8:
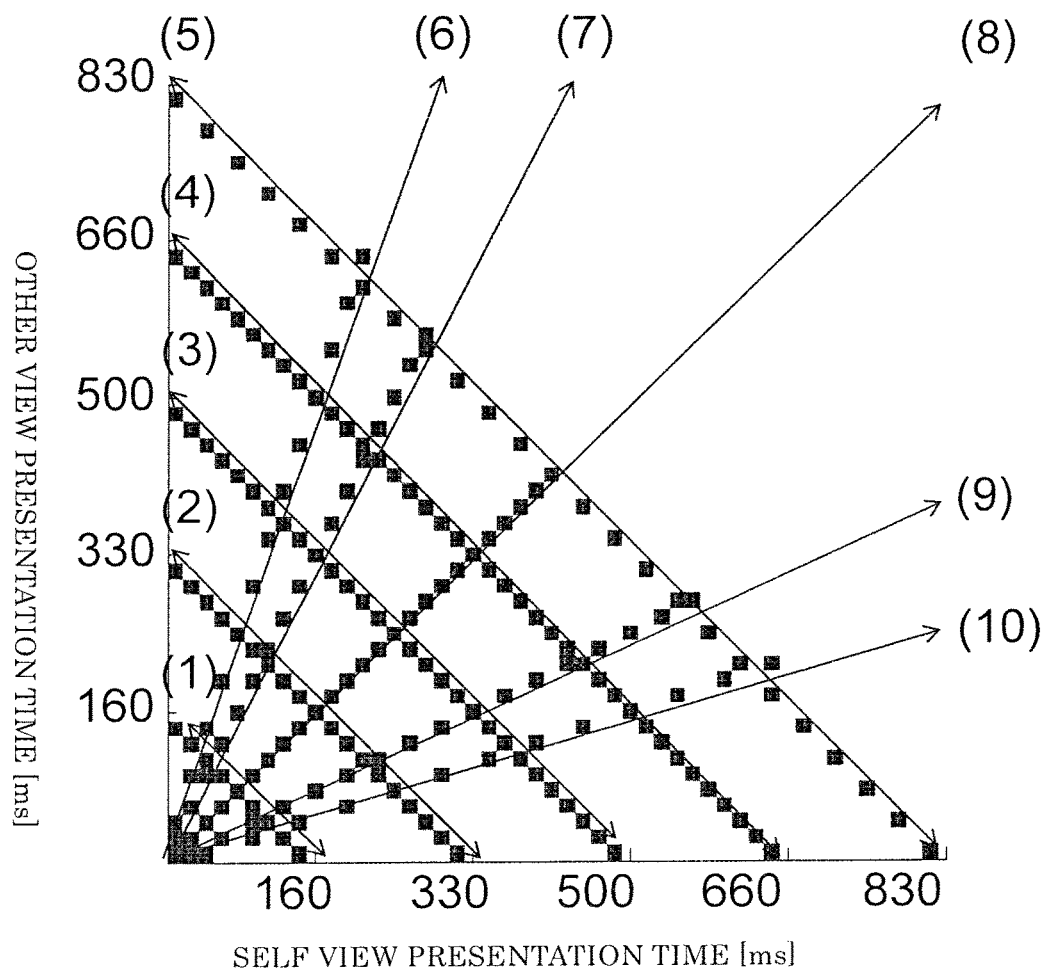
FIG. 8 shows the setting parameters of the experiment.

FIG. 8 shows the setting parameters of the experiment. As illustrated with (1) to (5) of FIG. 8, the cycle was set for each 10 frames as in about 160 ms (10 frames), about 330 ms (20 frames), 500 ms (30 frames), about 660 ms (40 frames) and about 830 ms (50 frames). Then, a plurality of experimental points are indicated with plots on the lines (i.e., the direction of the ratio) for each of the 10 frames.

As illustrated with (6) to (10) of FIG. 8, the ratio includes 1:3, 1:2, 1:1, 2:1 and 3:1 as the self-other ratio, and further includes experimental points at some points other than not along the lines for each of 10 frames. (6) shows 1:3, (7) shows 1:2, (8) shows 1:1, (9) shows 2:1 and (10) shows 3:1.

Figure 9:
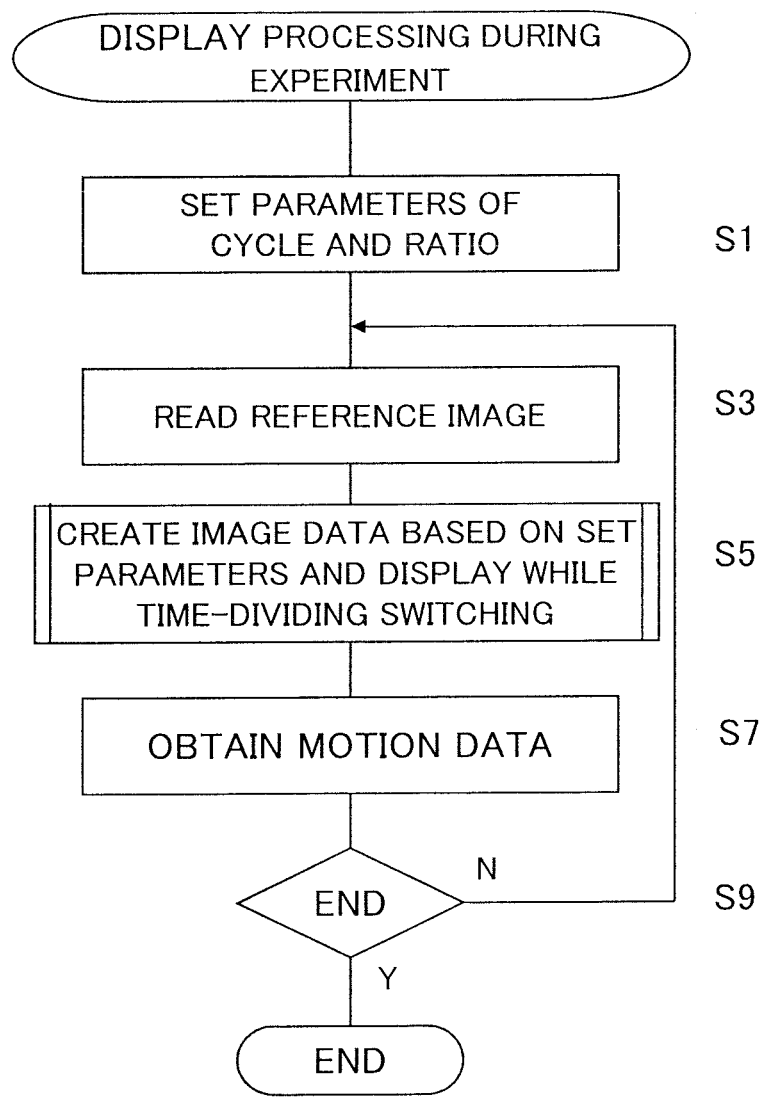
FIG. 9 is a flowchart to describe exemplary display processing during experiment that is executed by a controller.

FIG. 9 is a flowchart to describe exemplary display processing during experiment that is executed by the controller 21. After the examinee wears the VST-HMD 1, first parameter setting is performed via the operation unit 24 among the combinations of the cycle and the ratio (Step S1). Next, a a reference image is read to the image display device 11 (Step S3), and time-dividing switching display processing is performed in the examinee view image in accordance with the set parameters of the cycle and the ratio (Step S5). Then, motion data (position information) is detected by the magnetic sensors 141 and 142, and is recorded (Step S7). After a predetermined duration has elapsed, if it is determined that determination of ending is made in response to an instruction from the examinee or others (Yes at Step S9), the experiment for one set of setting parameters ends. If it is not determined as such, the procedure returns to continue the experiment. The returning processing is performed at least the same cycle as one frame or less, and switching processing of the screen is performed: at the timing of the setting parameters for the cycle and the ratio.

Every time another parameter is set, the flowchart of FIG. 9 is executed, whereby the experiment can be performed for all of the combinations of the parameters.

Figure 10:
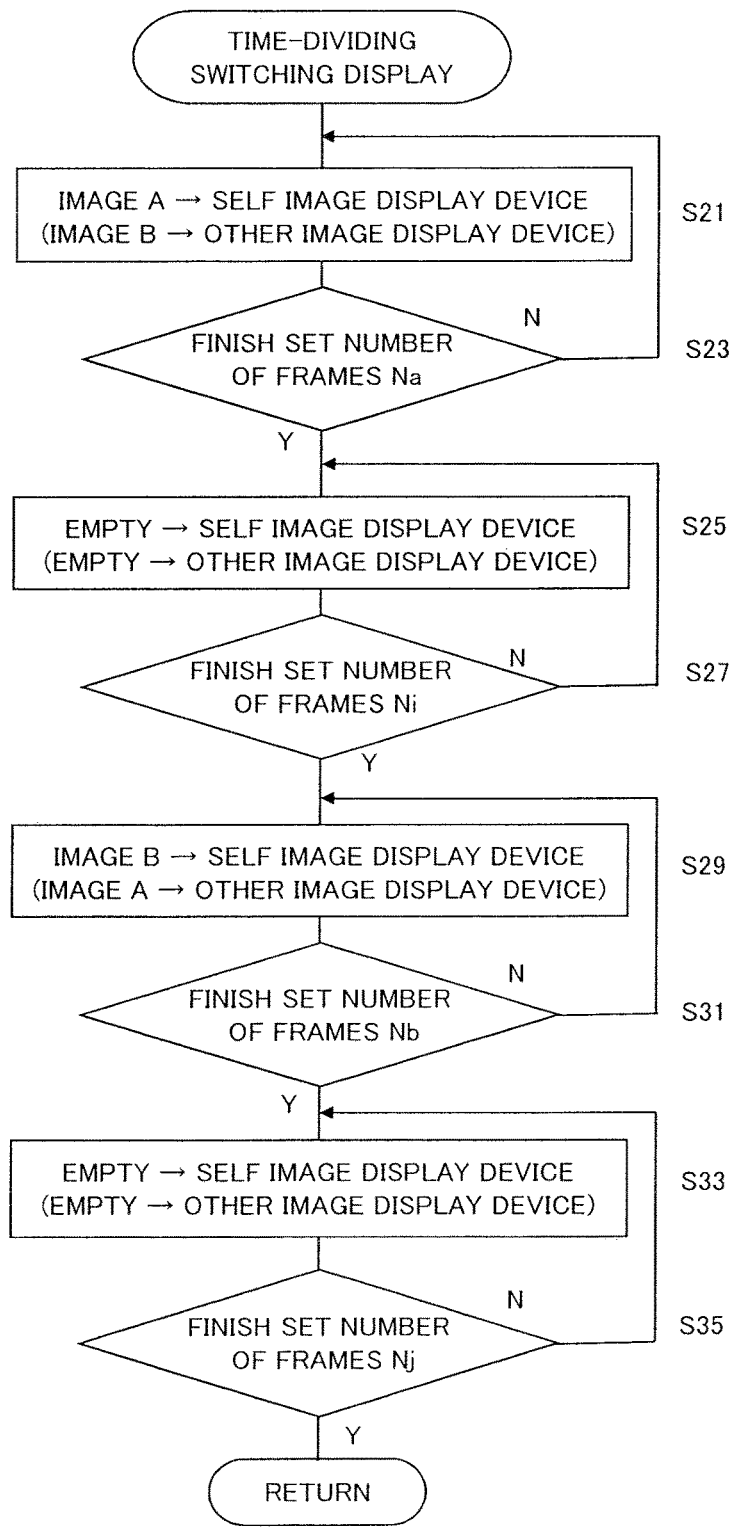
FIG. 10 is a flowchart to describe exemplary time-dividing switching display processing that is executed by a controller.

FIG. 10 is a flowchart to describe exemplary time-dividing switching display processing that is executed by the controller 21. In FIG. 10, when the reference image as the image B of the other person is a recorded image stored in the reference image storage unit 231, the processing to the image display device of the other person is not required. When the controller 21 is provided in each of the head-mounted type image display device for individual processing as well, the processing to the image display device of the other person is not required. The system may be configured so that one controller performs processing in a centralized manner for both of the head-mounted type image display devices, and in this case, as illustrated in FIG. 10, display switching processing is performed in a synchronized manner for the wearer and the other person, whereby the improved cooperation between the two persons can be expected.

In the present example, the parameters are set with the number of frames. Firstly, the self image A is read to the image display device 11 of the wearer (Step S21). Next, the number of frames for reading of the image A is counted, and a determination is made whether the count number reaches a set frame number Na or not (Step S23). If the count value does not reach the set frame number Na, the procedure returns to Step S21. On the other hand, if the count number reaches the set frame number Na, an empty image is read to the self image display device 11 (Step S25).

Next, the number of frames for reading of the empty image is counted, and a determination is made whether the count number reaches a set frame number N1 or not (Step S27). If the count value does not reach the set frame number N1, the procedure returns to Step S25. On the other hand, if the count number reaches the set frame number N1, the image B of the other person is read to the self image display device 11 (Step S29). Next, the number of frames for reading of the image B is counted, and a determination is made whether the count number reaches a set frame number Nb or not (Step S31). If the count value does not reach the set frame number Nb, the procedure returns to Step S29. On the other hand, if the count number reaches the set frame number Nb, an empty image is read to the self image display device 11 (Step S33). Next, the number of frames for reading of the empty image is counted, and a determination is made whether the count number reaches a set frame number Nj or not (Step S35). If the count value does not reach the set frame number Nj, the procedure returns to Step S33. On the other hand, if the count number reaches the set frame number Nj, the procedure returns to Step S21. This displaying state ends when external interruption is performed, for example.

The values Ni and Nj to set the empty duration are typically set at 0, and the values Ni and Nj can be set appropriately during the experiment, whereby the cycle and the ratio can be easily adjusted finely.

Figure 11:
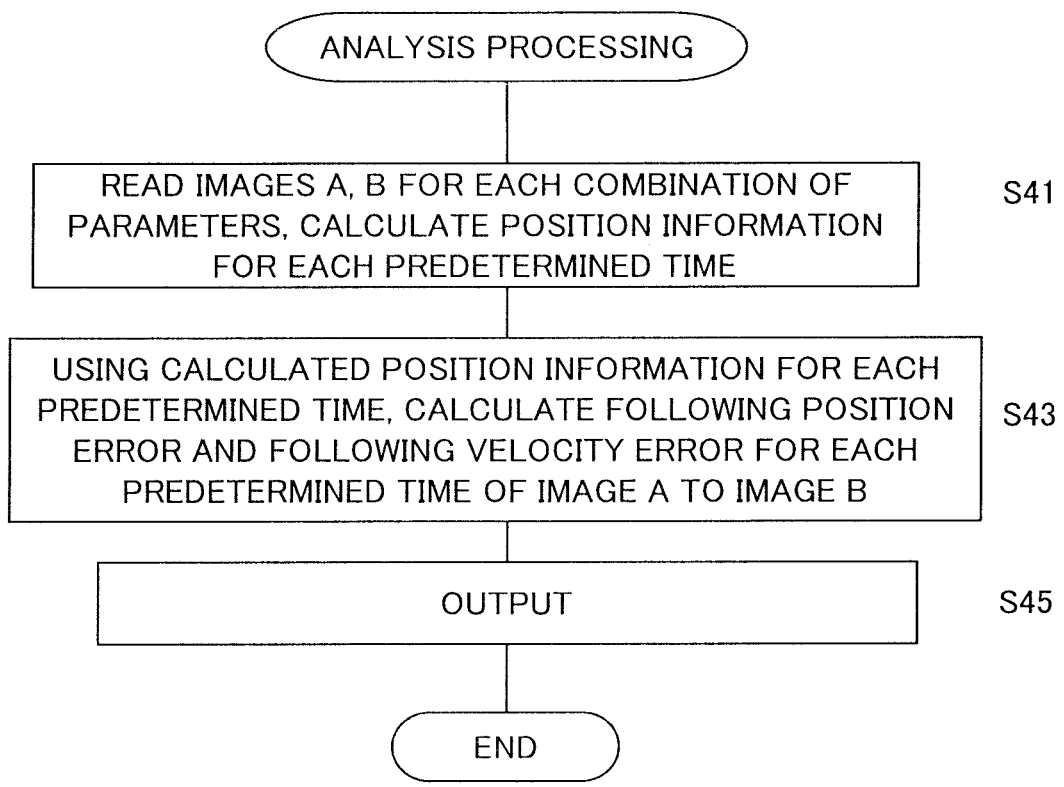
FIG. 11 is a flowchart to describe exemplary analysis processing that is executed by an analysis unit.

FIG. 11 is a flowchart to describe exemplary analysis processing that is executed by the analysis unit 31. After the experiment of FIG. 9 ends for all sets of the parameters, the analysis processing is executed. During the analysis processing, a position error in the following motion and a velocity error in the following motion are calculated for each parameter about the thumb and the middle finger. That is, the images A, B are read for each combination of the parameters, and the positional information for predetermined duration is calculated (Step S41). Next, a position error in the following motion and a velocity error in the following motion of the image A with reference to the image B for predetermined duration are to calculated based on the calculated position information for predetermined duration (Step S43). The calculated information is output to a storage unit not illustrated or the result output unit 32 (Step S45). The experiment is performed four times for each combination of the parameters, and an average of the four times is calculated.

Figure 12:
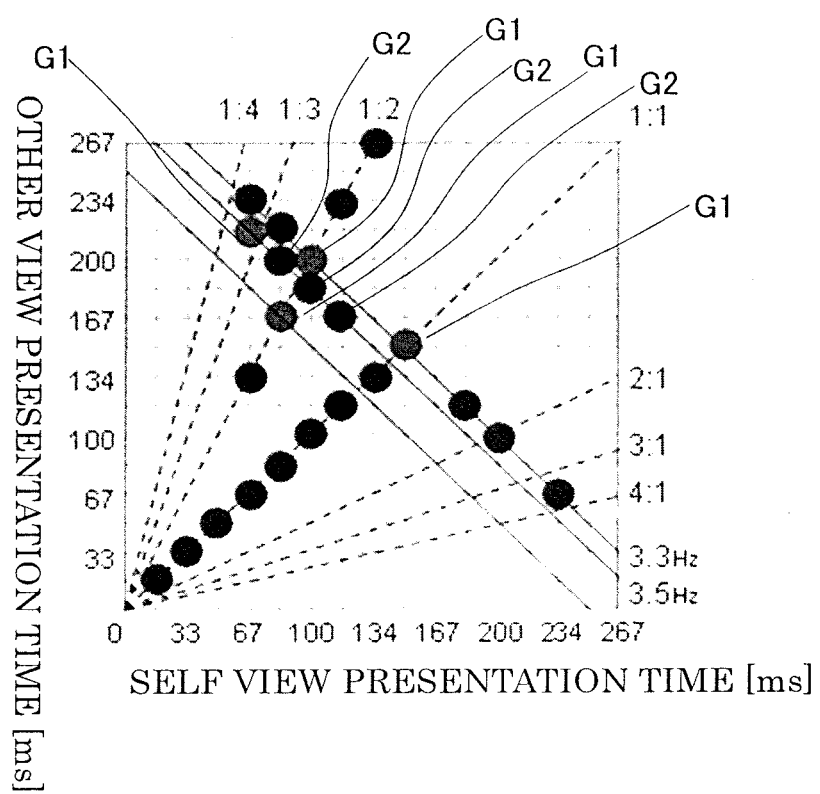
FIG. 12 is a partially enlarged view showing the presence or not of the blending feeling induced that is obtained from the experiments.

The examinee (wearer A) was asked in the form of a questionnaire about the presence or not of blending feeling induced for each combination of the parameters, which was the qualitative or physiological evaluation. FIG. 12 reflects the result of questionnaire, which is a partially enlarged view showing the presence or not of the blending feeling induced that is obtained from the experiments. A plurality of circle marks in FIG. 12 indicates the setting position of the parameters. The circle marks assigned with codes G1 show that the examinee felt the blending feeling induced. The circle marks assigned with codes G2 show that the examinee felt it at around the border of the presence or not of the blending feeling. Although not illustrated in FIG. 12, a result of the examinee feeling at the boundary of the presence or not of the blending feeling was obtained at a plurality of experiment points between the frequency of 3.3 Hz and 2 Hz along the line of the ratio 1:1. The circle marks other than them are based on the answers of the examinee not having any blending feeling induced. As a result, FIG. 12 shows that the range where the examinee can feel the blending feeling at least is from about 500 ms to about 250 ms in frequency (cycle) (about 2 Hz to about 4 Hz), and is from 1:1 to 1:3 in the self-other ratio.

FIGS. 13 and 14 are charts showing the evaluation about the following ability that was obtained from the experiment. FIG. 13 includes charts to describe the analysis results of the experiment when the cycle is a parameter in a typical ratio, e.g., the ratio of 1:2, and FIG. 14 includes charts to describe the analysis results of the experiment when the ratio is a parameter in a typical cycle, e.g., the cycle of 400 ms.

Figure 13A:
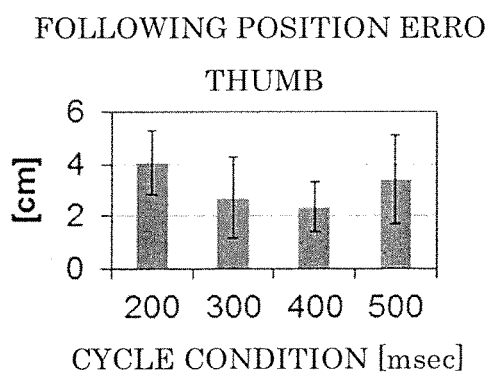
FIGS. 13A and 13C shows data on the thumb and the middle finger for a position error in the following motion.
Figure 13B:
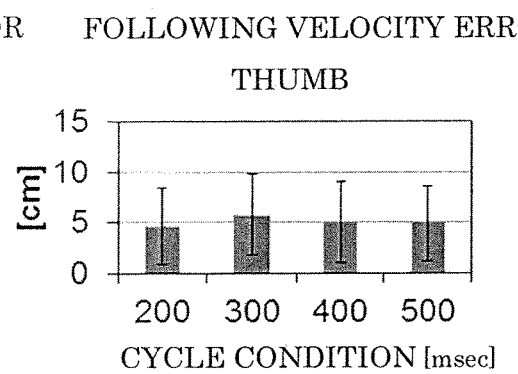
FIGS. 13B and 13D shows data on the thumb and the middle finger for a velocity error in the following motion.
Figure 13C:
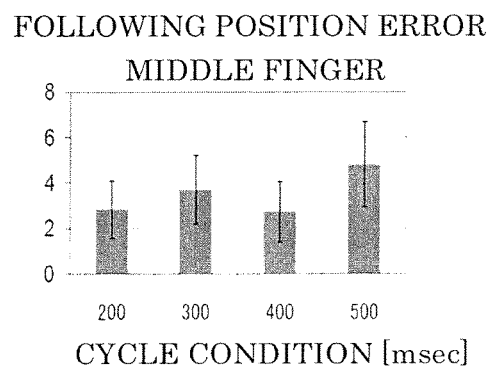
Figure 13D:
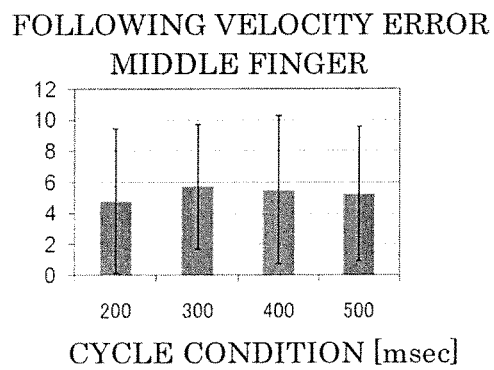

FIGS. 13A and 13C shows data on the thumb and the middle finger for a position error in the following motion, where the vertical axis represents an error (cm), and the horizontal axis represents the cycle (msec). The vertical axis of FIG. 13A has the maximum value of 6 cm on the scale, and the vertical axis of FIG. 23C has the maximum value of 8 cm on the scale. FIGS. 13B and D) shows data on the thumb and the middle finger for a velocity error in the following motion, where the vertical axis represents an error per second (cm), and the horizontal axis represents the cycle (msec). The vertical axis of FIG. 13E has the maximum value of 15 cm per second on the scale, and the vertical axis of FIG. 13D has the maximum value of 12 cm per second on the scale.

Figure 14A:
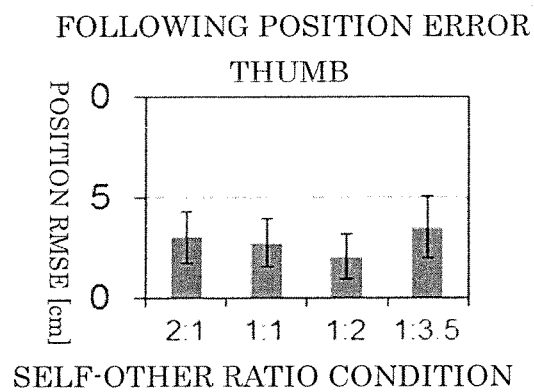
FIGS. 14A and 14C shows data on the thumb and the middle finger for a position error in the following motion.
Figure 14B:
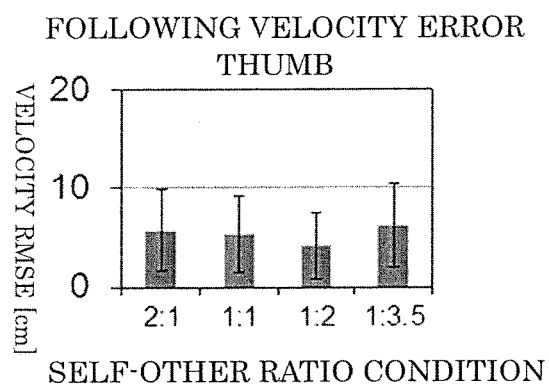
FIGS. 14B and 14D shows data on the thumb and the middle finger for a velocity error in the following motion.
Figure 14C:
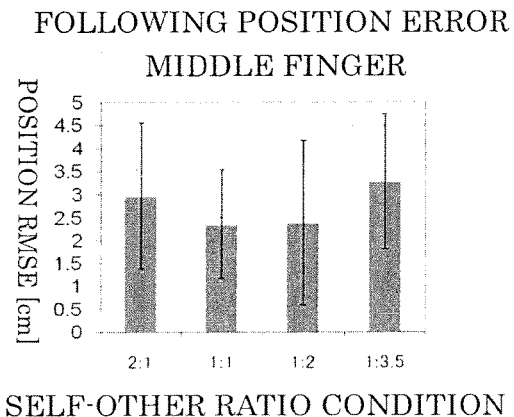
Figure 14D:
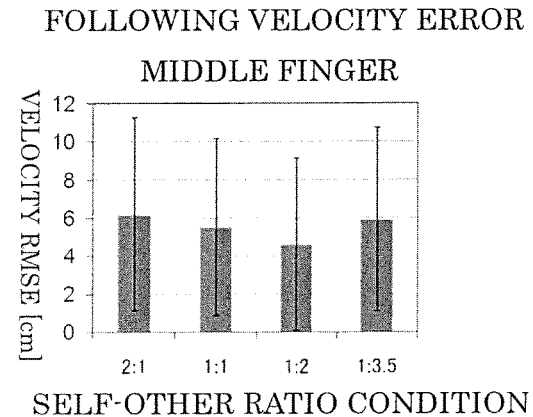

FIGS. 14A and 14C shows data on the thumb and the middle finger for a position error in the following motion, where the vertical axis represents an error (cm), and the horizontal axis represents the ratio. The vertical axis of FIG. 14A has the maximum value of 10 cm on the scale, and the vertical axis of FIG. 14C has the maximum value of 5 cm on the scale. FIGS. 14B and 14D shows data on the thumb and the middle finger for a velocity error in the following motion, where the vertical axis represents an error per second (cm), and the horizontal axis represents the self-other ratio. The vertical axis of FIG. 14B has the maximum value of 20 cm per second on the scale, and the vertical axis of FIG. 14D has the maximum value of 12 cm per second on the scale.

Then, according to the experimental results of FIG. 13A, 13C, the comprehensive observation of the thumb and the middle finger shows that the preferable range of the cycle is about 300 ms (3.3 Hz) to 400 ms (2.5 Hz), which is more preferable at about 400 ms (2.5 Hz). According to FIG. 13B, 13D, the accuracy of velocity in the following motion has low dependency on the cycle.

According to the experimental results of FIG. 14A, 14C, the comprehensive observation of the thumb and the middle finger shows that the preferable: range of the ratio for the position accuracy in the following motion is about 1:1 to 1:2, which is more preferable at about 1:2. According to FIG. 14B, 14D, the accuracy of velocity in the following motion does not change so much from that of FIG. 14A, 14C, and so the preferable range of the ratio is about 1:1 to 1:2, which is more preferable at about 1:2.

In FIG. 3, a predetermined parameter is set at the display mode setting unit 213 so that the view images of the wearer and the other person are displayed alternately in a time-dividing manner at the image display device 11 within the range of the cycle (frequency) and the range of the ratio that are obtained by <Experiment II>. The setting parameter may be switched based on time by using measured-time information from a built-in timer of the processing device 2 instead of setting it based on the number of frames.

Minimizing the position error and the velocity error between the motions of two persons makes the device applicable to a remote cooperation supporting system or the like to display the images in a time-dividing manner between an instructor and an operator in the scene of a remote operation, for example. Such a remote operation scene assumed may be a scene where a motion skill of an expert such as in emergency medical care and surgery can be conveyed naturally. Then, the motion skill can be conveyed naturally, whereby more complicated motion skills also can be transmitted. In this way, an effective and novel method can be provided at the cost that is not different so much from the conventional method.

That is the experimental result of the time-dividing presentation that is designed with an appropriate parameter for the switching time so that the wearer and other person's upper limb (such as arms and hands) motions are blended better and so the self-other blending feeling can be generated as if the motion were the wearer's motion. This phenomenon suggests the illusion generated as if the wearer could perform like the other person even when the time consistency between sense and motions during the continuous duration for the other person's upper limb is not kept strictly. Factors causing this phenomenon are examined, whereby the possibility of relaxing requirements for the real-time characteristics in designing of an interface to hold the sense of immersion can be increased, and so industrial applicability thereof can be improved.

As described later, a factor causing the self-other blending feeling may be any one of or both of the perceptive continuity of the motions, which are the two person's motions grouped because of apparent movement perception, i.e., which appears as one motion, and of the physical synchronization of the motions because the following motion control system is driven under the consciousness. Then to verify these points, the following experiments (Experiments III . . . ) were performed to quantify the self-other blending feeling phenomenon and try to verify the contributions of the perspective continuity and the physical synchronization of the motions as the factors for causing the phenomenon.

Herein the apparent movement perception is a phenomenon such that when two light-spot stimuli at a certain distance therebetween are presented at an appropriate time interval over time, they appear as if one target moved smoothly between the two stimulus-presenting positions (Chikaku Shinrigaku handbook in Japanese, edited by Tadashi OOYAMA, Syogo IMAI, Tenji WAKE, published by Seishin-Shobo, 1994). This is similar to primary auditory stream segregation (hereinafter called PASS). That is, a similar phenomenon is known for visual perception as well, which is called visual stream segregation (hereinafter called VI-S) (Albert S. Eregman and Andre Achim, ¥Visual stream segregation," Perception and Psycho physics, Vol. 13, No. 3, pp. 451-454, 1973).

<Experiment III>

Figure 16:
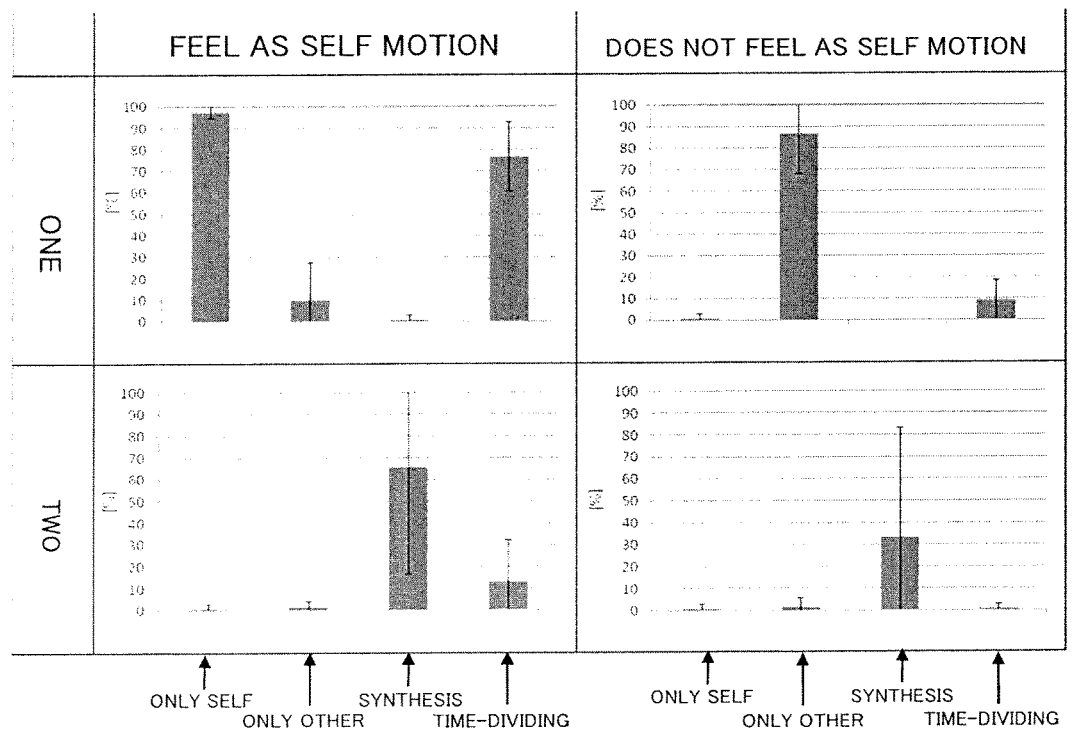
FIG. 16 includes charts showing evaluations as to the presence or not of self-other blending feeling under the various view presentation conditions.

FIG. 15 describes various view presentation conditions in an experiment where an examinee shakes his/her upper limb left and right, and FIG. 16 includes charts showing evaluations as to the presence or not of self-other blending feeling under the various view presentation conditions. In FIG. 15, FIG. 15A is a display mode of the self view method, FIG. 15B is a view exchanging method, FIG. 15C is a view synthesis method, and FIG. 15D is a view time-dividing method. In the view time-dividing method (D) of this Experiment III, the display time of the self image was set at 133 ms, the display time of the other person's image was set at 267 ms, and the cycle was set at 400 ms. This Experiment III was performed under the same environment as that of FIG. 6. However, the examinee wore just one magnetic sensor 141 at any part of the upper limb.

FIG. 16 includes the charts made up of cells representing two reports from the examinees after the experiment. The cells represent whether the upper limbs appeared as "one" or "two" in the vertical direction, and represent whether "the wearer feels as if she/he moved the upper limb" or "the wearer does not feel as if she/he moved the upper limb" in the horizontal direction. These charts describe the results of reports collected from the examinees.

This experiment was performed by six examinees with a chance level of 25% (% obtained when selections were made at random in the four types of display modes) or more, from which data was collected. Each experiment was performed for each display mode and for each person 30 times. The vertical axis [%] of the cells represents the ratio to the entire reports, and an analysis was made based on ANOVA (analysis of variance) that is an assay to be used for comparison of multi-groups to check whether it is unlikely to be coincidental stochastically or not, i.e., the presence or not of the significance.

Since the self-other blending feeling means that the upper limb appears as "one" and "the examinee feels as if he/she moved the upper limb". FIG. 16 shows that the view time-dividing method is significantly different from the other display modes at the level of 1%. This is consistent with Experiment I and Experiment II as well.

<Experiment IV>

Next another experiment was performed to quantify the self-other blending feeling phenomenon where the upper-limb motions of the examinee and the other person are blended and the examinee feels as if the motions were their own motions. The self-other blending feeling is different from a conventional illusion phenomenon about the examinee himself/herself that the feeling as if the motion was his/her own motion is not shifted from the examinee's body to the other person's body, but the examinee feels as if what includes the examinees body as well as the other person's body comprehensively was his/her own. Then, it can be considered that, when the examinee is asked to tell the position of his/her upper limb during the view time-dividing presentation, if the self-other blending occurs, the examinee would tell the position including the self upper limb and the other person's upper limb comprehensively, if the shifting as in conventional phenomenon occurs, the examinee would tell the other person's upper limb position, and if any of the blending and the shifting does not occur, the examinee would tell the correct upper limb position of his/her own. In this Experiment IV, using the task to reach the upper limb to a visual target, the examinee was asked to tell the self upper limb position.

Figures 17A, 17B:
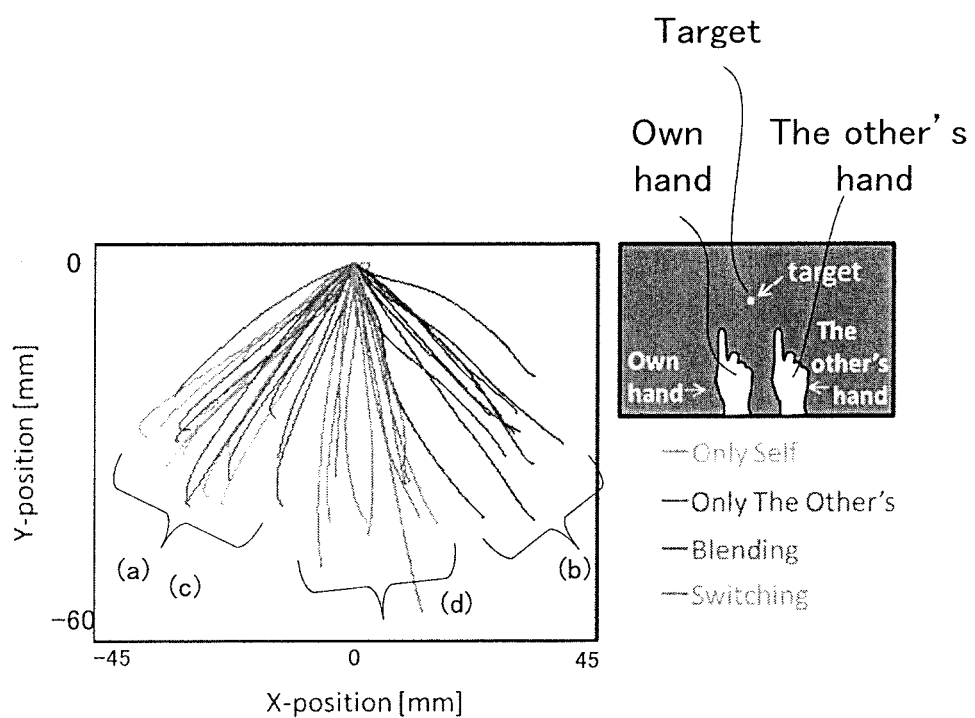
FIG. 17A shows the experimental result of a certain examinee.
FIG. 17B shows the display screen of the HMD 1.

FIG. 17 describes the procedure in Experiment IV and its result, where FIG. 17A shows the experimental result of a certain examinee, and FIG. 17 B shows the display screen of the HMD 1. This Experiment IV was performed using the device of FIG. 6, and preferably the HMD 1 was fixed to the desk with a fixing tool or the like for the examinee during the experiment. The examinee was wearing the magnetic sensor 141 at the upper limb, e.g., at the index finger. As illustrated in FIG. 17B, the screen of the HMD 1 can display an image of the self upper limb image, an image of the other person's upper limb and a visual target (Target; hereinafter denoted as (T)). Herein, the self upper limb image and the other person's upper limb image were displayed at a distance of 30 mm therebetween, and a small visual target (Target; indicated as a white square was displayed at a position of 50 mm above from the middle position between the self upper limb image and the other person's upper limb image.

This Experiment IV was performed for each display mode of (a) self view presentation, (b) the other person's view presentation (view exchange), (c) brightness superimposed presentation of the self-other views (view synthesis), and (d) view time-dividing presentation (cycle of 400 milliseconds, self-other view presenting time ratio of 1:2). The experiment was performed by ten examinees ten times for each display mode. This Experiment IV further included, in addition to (d) view time-dividing presentation (cycle of 400 milliseconds, self-other view presenting time ratio of 1:2), (d2) view time-dividing presentation (cycle of 400 milliseconds, self-other view presenting time ratio of 2:1) and (d3) view time-dividing presentation (cycle of 400 milliseconds, self-other view presenting time ratio of 1:1) as described later.

In any display mode, the visual target (T) was lit at predetermined intervals, and the examinees were asked to perform the motion to reach their upper limbs (in this experiment, the index fingers) to the position of the visual target (T) quickly and precisely. The movement of the index finger was measured as the position of the magnetic sensor 141.

The experiment was performed as follows. Firstly, the examinees were asked to perform the reciprocal motion for 4 seconds in the state where visual information was blocked. Next, while visual information was displayed in each display mode as above for 4 seconds, the examinees continued the reciprocal motion. Next, the visual information was blocked and the examinees were asked to stop the motion and to stand by at the center of the screen for 2 seconds. Subsequently, the visual target (T) was displayed at a predetermined position for 500 ms only, and upon being presented with the visual target (T), the examinees were asked to perform the motion to reach their index fingers to the position of the visual target (T) quickly and precisely. The examinees were instructed for the reaching motion "to perform the motion to reach the position where your index finger seems located to the visual target (T) as quickly and precisely as possible."

FIG. 17A illustrates the history of trajectories (directions) when the starting positions of reaching mot ion with the index finger of a certain examinee are estimated while placing their end points to the same point. For (d) view time-dividing presentation, the position estimated was the middle position between the self upper limb image and the other person's upper limb image.

This shows that, in the display modes of (a) self view presentation and (c) view synthesis presentation, the examinees generally moved their index fingers from the self upper limb image toward to the visual target (T), in the display mode of (b) view exchange presentation, the examinees generally moved their index fingers from the other person's upper limb image to the visual target (T), and in (d) view time-dividing presentation, the examinees generally moved their index fingers upward.

Figure 18A:
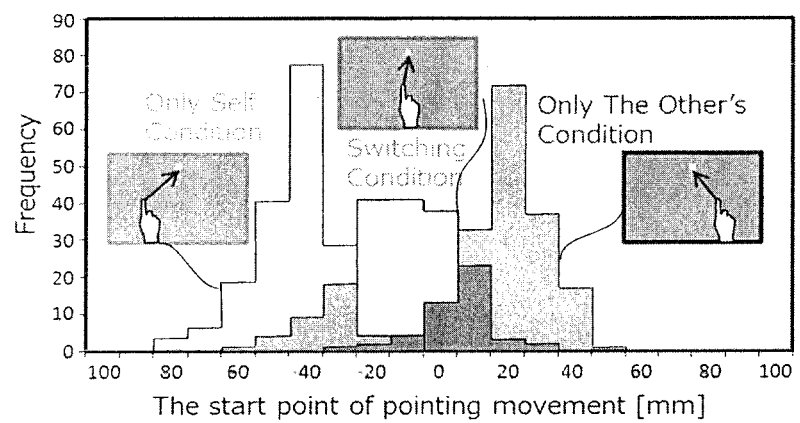
FIG. 18 includes histograms of the staring positions estimated for the reaching motions in Experiment IV, where FIGS. 18A and 18B both include (d) view time-dividing presentation, which are divided for easy understanding of relationships with the other display modes.
Figure 18B:
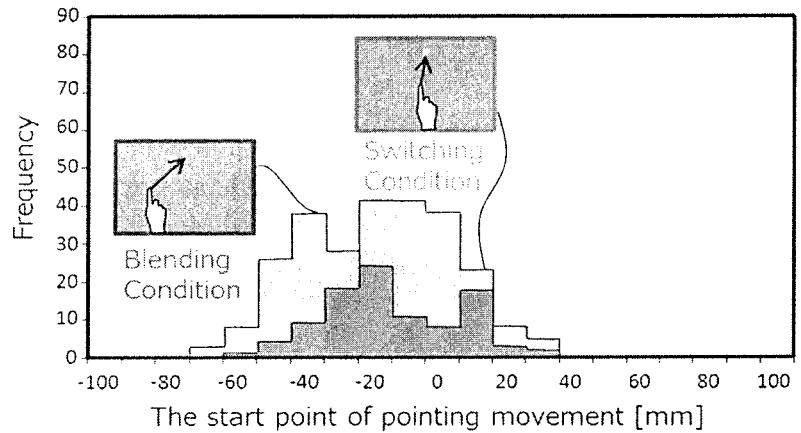

FIG. 18 shows histograms of the staring positions estimated for the reaching motions in Experiment IV, where FIGS. 18A and 18E both include (d) view time-dividing presentation, which are divided for easy understanding of relationships with the other display modes. In FIG. 18, the horizontal axis represents the distance in the horizontal direction (x direction) with reference to the middle position between the self upper limb image and the other person's upper limb image, and the vertical axis represents frequency, i.e., the number of times of the reaching motion.

Figure 19A:
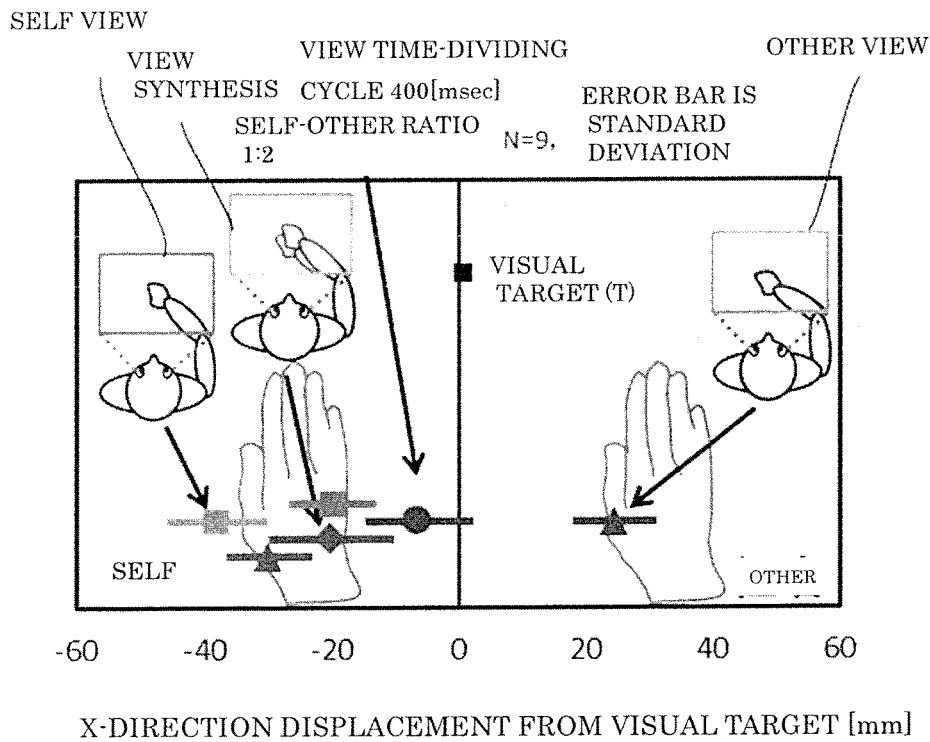
FIG. 19A illustrates the average position of each display mode and their standard deviations on the display of the HMD 1, and in FIG. 19B, the horizontal axis represents the display modes, and the vertical axis represents z-direction displacement from the visual target (T).
Figure 19B:
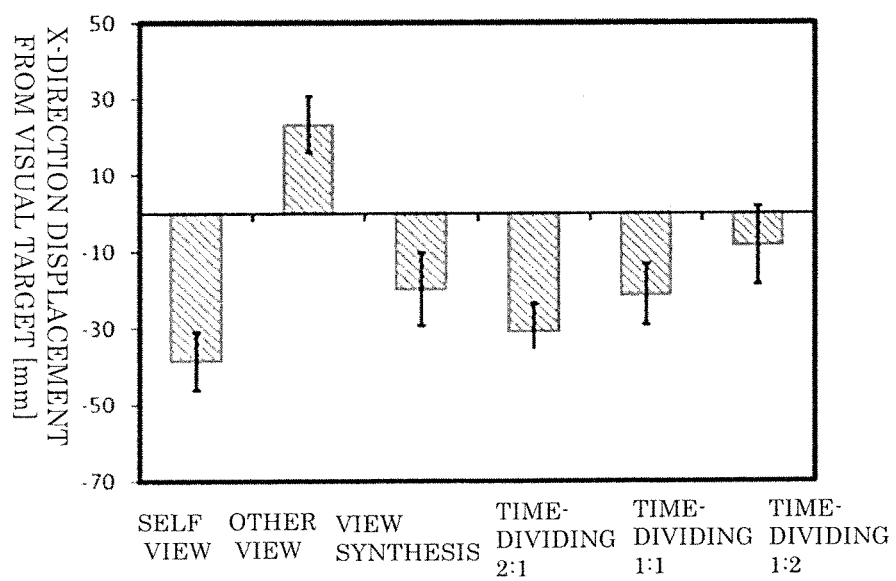
FIG. 19 includes charts to illustrate the average starting positions that are estimated of the reaching motions for each display mode, where

FIG. 19 includes charts to illustrate the average starting positions that are estimated of the reaching motions for each display mode. The display modes herein includes the above-mentioned (d2) view time-dividing presentation (cycle of 400 milliseconds, self-other view presenting time ratio of 2:1) and (d3) view time-dividing presentation (cycle of 400 milliseconds, self-other view presenting time ratio of 1:1 as well. FIG. 19A illustrates the average position of each display mode and their standard deviations on the display of the HMD 1 and in FIG. 19B, the horizontal axis represents the display modes, and the vertical axis represent x-direction displacement from the visual target (T).

As illustrated in FIG. 19B, (d) view time-dividing presentation with the self-other view presenting time ratio of 1:2 shows significantly small deviation from the visual target (T), and the examinees performed the reaching motions from the midpoint between the self upper limb image and the other person's upper limb image.

FIG. 18 and FIG. 19 show that, under the condition of (a) self view presentation or (c) view synthesis presentation, the examinees performed the reaching motion from the self upper limb position toward to the visual target (T). Especially under the condition of (a) self view presentation, the distance of the motion tends to increase. This is because that the examinees could clearly understand the viewed upper limb as his/her own, and so performed the reaching motion with certainty. Under the condition of (c) view synthesis presentation, dispersion tends to increase. This is because the upper limbs of the both persons do the same motion, and so the examinee infrequently understands the other person's upper limb as the self upper limb mistakenly. On the other hand, under the condition of (b) the other person's to view presentation, the examinees performed the reaching motion from the other person's upper limb position to the visual target (T). Although the other person's upper limb motion is deviated from the actual self upper limb position, the amplitude and the velocity of the reciprocal motion were similar to those of the self motion, and so the examinee could synthesize the other person's motion with the somatosensory information and motion command information of his/her own, and transfer illusion presumably occurred at the self upper limb position. Then under the condition of (d) view time-dividing presentation, as the ratio of the other view increases, the self upper limb position is shifted to the midst of the self and the other person's upper limbs. Especially under the condition of (d) view time-dividing presentation where the switching cycle was 400 ms and the self-other view presenting time ratio was 1:2, the estimated starting point of the reaching motion substantially agreed with the midst of the self and the other person's upper limbs. It can be explained that this means the self and other upper limbs being blended into one, and the illusion as if they were the self upper limb. Since this agrees with the time parameters of the view switching inducing the self-other blending feeling phenomenon, it can be considered that the self-other blending feeling could be successfully quantified.

The reason, why, when the self-other view presenting time was 1:2, the examinee placed his/her upper limb at the most middle position between the self upper limb image and the other person's upper limb image can be considered as follows. That is, under the condition of (d) view time-dividing presentation having the view switching cycle of 400 ms and the self-other view presenting time ratio of 1:2, the self view and the other view were presented for 133 ms and 267 ms, respectively. Then, the reason can be because the examinee can easily make a synchronous determination with the self image in a shorter time in the self view where the motion with higher consistency is presented than in the other person's view where the motion different from the self motion is presented. Presumably the presentation time in the self view that is required for the consistency determination on the self view somatic sense, the self motion information such as motion commands and the visual information would be longer than 133 ms. If the self view is presented for 133 ms or longer, the examinee will perform the integration with the somatosensory information and motion command information of his/her own motion, and make the consistency determination with the motion in the self view only. Since the self-other blending feeling started to occur strictly when the self-other view presentation time ratio was 1:1, the presentation of 200 ms or longer would be preferable.

Experiment IV clarified that the self upper limb position is shifted between the self and other upper limbs based on the time parameter of the self-other view switching. Then, it is defined so that, when the self upper limb position is placed at the midst of the self and other upper limbs, the self-other blending feeling occurs. Next, the following examines how a change of the time parameter of self-other view switching influences the occurrence of the self-other blending feeling.

Figure 20:
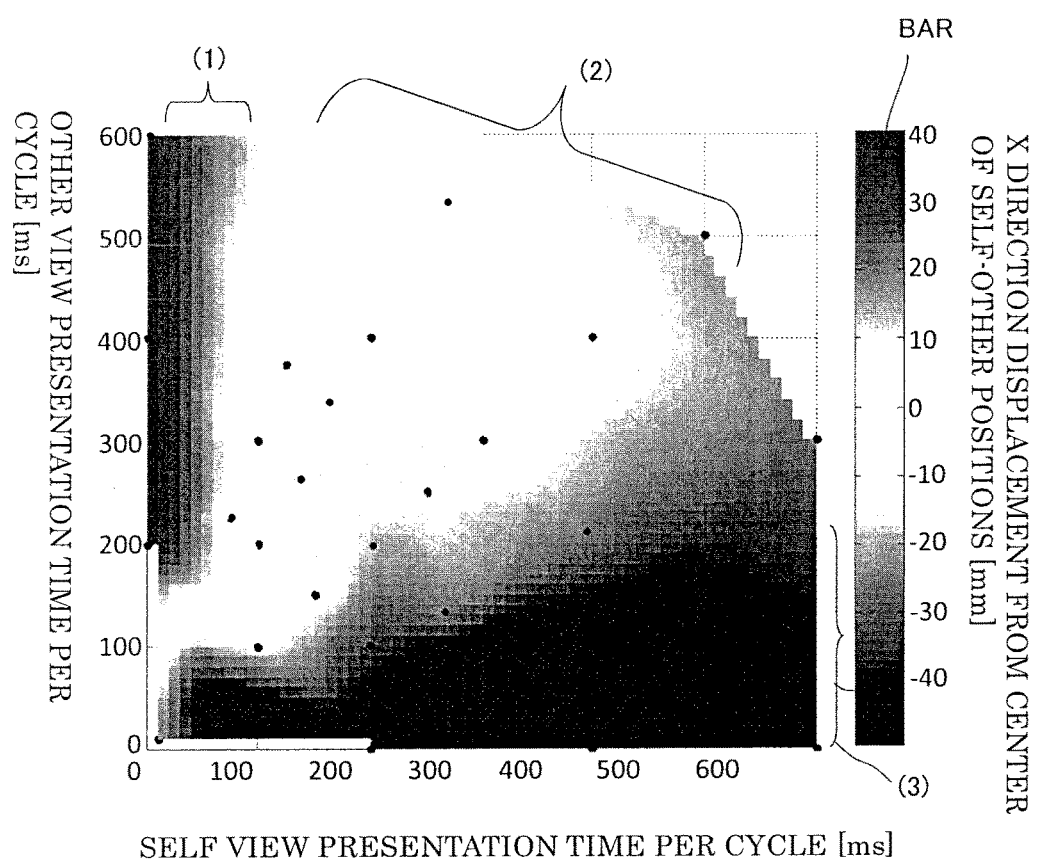
FIG. 20 is a heat chart diagram illustrating the displacement of the estimated starting points of reaching motion from the visual target (T) in the x direction when visual information was displayed for 4 seconds in each display mode of Experiment IV.

FIG. 20 is a heat chart diagram illustrating the to displacement of the estimated starting points of reaching motion from the visual target (T) in the x direction when visual information was displayed for four seconds in each display mode of Experiment IV. The horizontal axis represents the self view presentation time, and the vertical axis represents the other view presentation time. The experiment was performed for one examines while exchanging the self upper limb position between left and right, each of which was performed ten times. Black dots in the chart correspond to the time parameters for the measurement, and interpolation is performed at the other parts using known interpolation processing (using grid data function of MATLAB, two-dimensional cubic interpolation per 10 ms). This chart is represented in black and white, and BAR along the vertical axis on the right represents the displacement amount.

The display modes for the experiment were as follows:

self-other view time-dividing presentation (cycle of 100 milliseconds, self-other view presenting time ratio of 1:1;

self-other view time-dividing presentation (cycle of 200 milliseconds, self-other view presenting time ratio of 1:1);

self-other view time-dividing presentation (cycle of 300 milliseconds, self-other view presenting time ratio of 1:1);

self-other view time-dividing presentation (cycle of 300 milliseconds, self-other view presenting time ratio of 1:2);

self-other view time-dividing presentation (cycle of 300 milliseconds, self-other view presenting time ratio of 1:3);

self-other view time-dividing presentation (cycle of 300 milliseconds, self-other view presenting time ratio of 2:1);

self-other view time-dividing presentation (cycle of 400 milliseconds, self-other view presenting time ratio of 1:3);

self-other view time-dividing presentation (cycle of 400 milliseconds, self-other view presenting time ratio of 3:1);

self-other view time-dividing presentation (cycle of 500 milliseconds, self-other view presenting time ratio of 1:1);

self-other view time-dividing presentation (cycle of 500 milliseconds, self-other view presenting time ratio of 1:2);

self-other view time-dividing presentation (cycle of 500 milliseconds, self-other view presenting time ratio of 1:3);

self-other view time-dividing presentation (cycle of 600 milliseconds, self-other view presenting time ratio of 1:1);

self-other view time-dividing presentation (cycle of 600 milliseconds self-other view presenting time ratio of 1:2);

self-other view time-dividing presentation cycle of 600 milliseconds, self-other view presenting time ratio of 1:3;

self-other view time-dividing presentation (cycle of 600 milliseconds, self-other view presenting time ratio of 2:1);

self-other view time-dividing presentation (cycle of 800 milliseconds, self-other view presenting time ratio of 1:1);

self-other view time-dividing presentation (cycle of 800 milliseconds, self-other view presenting time ratio of 1:2;

self-other view time-dividing presentation (cycle of 800 milliseconds, self-other view presenting time ratio of 1:3);

self-other view time-dividing presentation (cycle of 900 milliseconds, self-other view presenting time ratio of 1:2);

self-other view time-dividing presentation (cycle of 900 milliseconds, self-other view presenting time ratio of 2:1); and self-other view time-dividing presentation (cycle of 1,000 milliseconds, self-other view presenting time ratio of 1:1).

Leading lines (1), (2) and (3) are shown for reference at the positions in the chart corresponding to the values on the BAR. In FIG. 20, as shown with the leading line (1), the displacement amount +30 to +40 mm corresponds to the left end area of the heat chart, and the part around the display amount: of −40 mm corresponds to the lower area of the heat chart as shown with the leading line (3), between which the part around the displacement amount of 0 mm exists as shown with the leading line (2). It can be considered that, in the area shown with the leading line (3), the reaching motion was performed from the self upper limb position to the visual target (T), and in the area shown with the leading line (1), the reaching motion was performed from the other person's upper limb position to the visual target (T). In the area shown with the leading line (2), the reaching motion was performed on average from the midst of the self and the other person's upper limbs to the visual target (T). This shows that as the ratio of the self view presentation time increased, the examinee performed the reaching motion from the self upper limb position correctly. On the other hand, it seems that, as the ratio of the other view presentation time increased, the self upper limb position tended to shift to the other person's upper limb position, and so the reaching motion tended to be performed from the other person's upper limb position. It seems that, at the midst thereof, the reaching motion was per formed from the midst of the self and the other person's upper limbs.

By the way, it is not clear from FIG. 20 whether the reaching motion was performed while placing the self upper limb position at the midst of the self and other upper limbs because of the blending feeling generated or the average was 0 apparently because the case of the reaching motion performed from the self upper limb position and the case of the reaching motion from the other person's upper limb position were mixed. To examine this, a histogram of the starting points of the reaching motions was created under the condition of the self view presentation time and the other person's view presentation time of 200 ms and 400 ms (view switching cycle of 600 ms, self-other view presentation time ratio of 1:2), respectively, and was observed. Then the histogram show a bimodality having 0 as the center, and so the mixture of the case of the reaching motion performed from the self upper limb position and the case of the reaching motion from the other person's upper limb position was confirmed. Then, in order to distinguish such a case from the reaching motion from the middle position of the self and other upper limbs, absolute values were found for the displacements of the all estimated starting points of the reaching motions from the reaching point (x=0), and the average thereof was calculated. If the average becomes 0 apparently because of the mixture of the case of the reaching motion performed from the self upper limb position and the case of the reaching motion from the other person's upper limb position, the average circulated by this analysis will be larger than 0.

Figure 21:
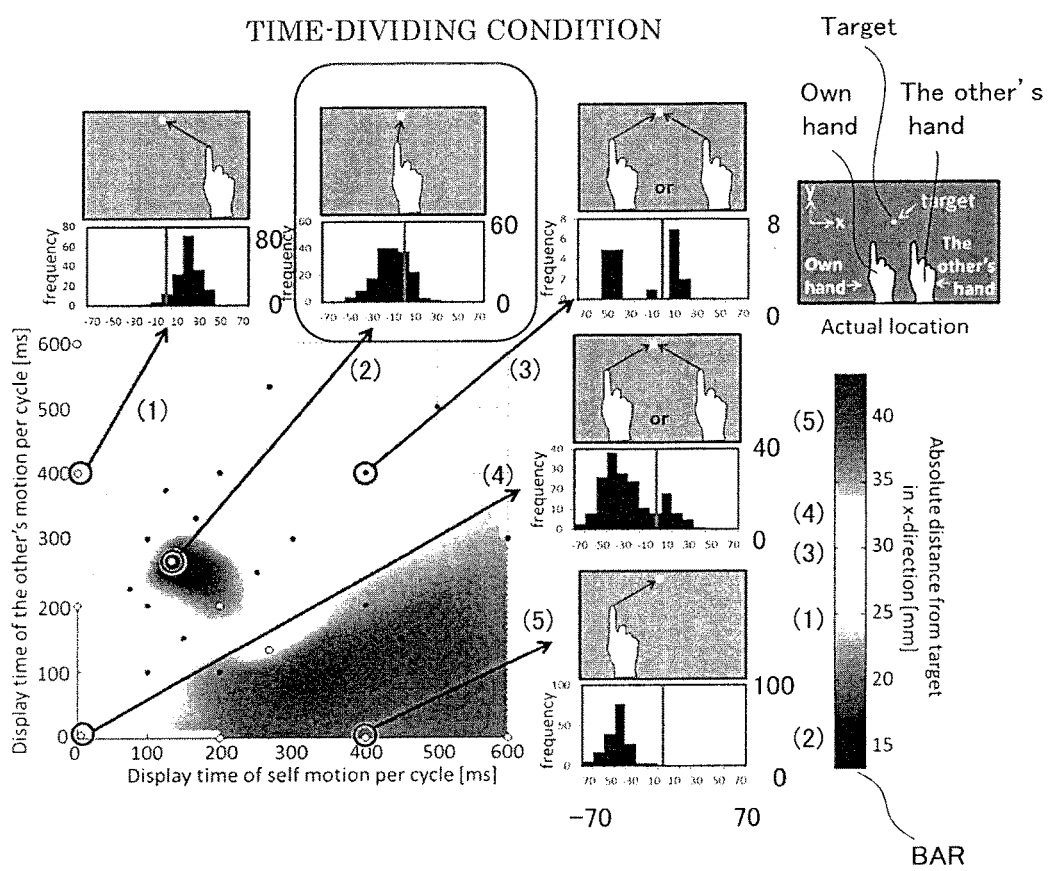
FIG. 21 includes a heat chart diagram that is based on the displacement data between the reaching motion starting point and the reaching point for each view presentation condition, to which two-dimensional cubic interpolaration is performed using a grid data function of MATLAB, and histograms of the reaching motion starting points obtained at predetermined measurement positions.

FIG. 21 includes a heat chart diagram that is based to on the thus found displacement data between the reaching motion starting point and the reaching point for each view presentation condition, to which two-dimensional cubic interpolation is performed using a grid data function of MATLAB, and histograms of the reaching motion starting points obtained at predetermined measurement positions. In FIG. 21, white circles represent nine examinees, and a black circle represents one examinee. The displacement amounts (absolute values) as the measurement results at the measurement positions (1), (2), (3), (4) and (5) of the time parameter in the chart can be known from the numbers of measurement positions that are written along the BAR at the corresponding positions. FIG. 21 shows that the displacement amount is large around the measurement position (5), and is relatively small at the other measurement positions, (1), (2), (3) and (4). Especially, the displacement amount is small at the measurement position (2).

Figure 22A:
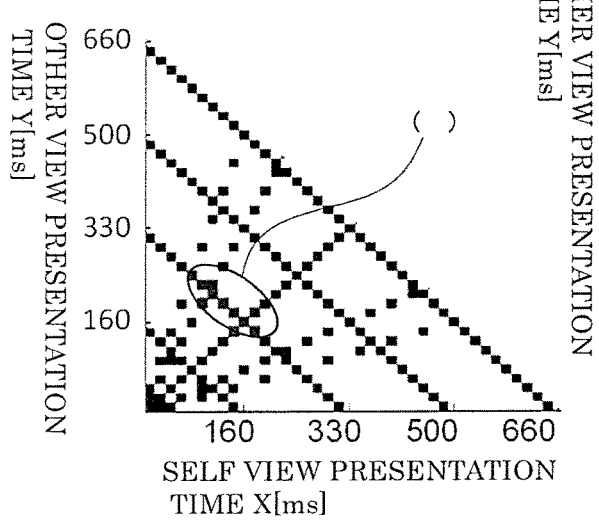
FIG. 22A illustrates the occurrence range (α) of the blending feeling based on introspection and, which corresponds to FIG. 12.
Figure 22B:
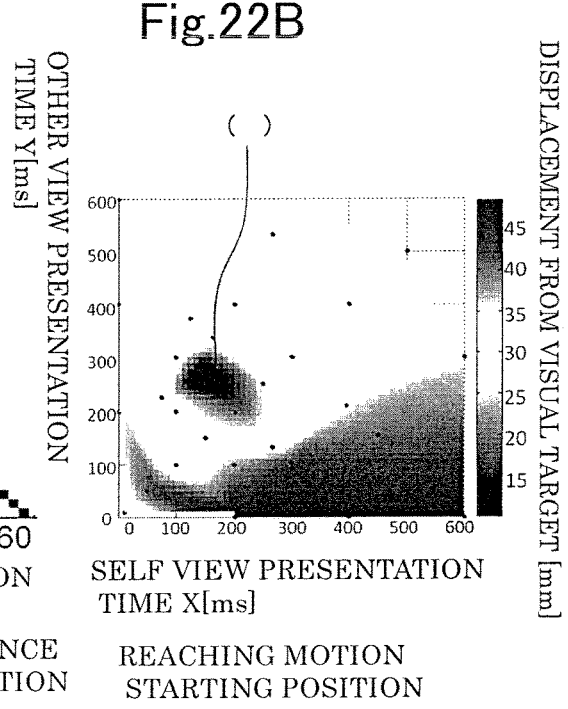
FIG. 22B illustrates the displacement of the reaching motion starting position, which corresponds to the heat chart diagram of FIG. 21.

FIG. 22 describes the relationship of the blending feeling and the displacement of the reaching motion starting position based on introspection, where FIG. 22A illustrates the occurrence range ($\alpha$) of the blending feeling based on introspection, which corresponds to FIG. 12. FIG. 22B illustrates the displacement of the reaching motion starting position, which corresponds to the heat chart diagram of FIG. 21. As illustrated in FIG. 22B, an area with less displacement from the visual target (T) exists at an area indicated with ($\beta$).

These drawings show that the area where the reaching motion was performed from the middle position between the self upper limb and the other person's upper limb corresponds to the self view presentation time and the other person's view presentation tune of 100 to 200 ms and 200 to 300 ms, respectively (i.e., the area ($\alpha$)). Comparison of FIG. 22A and FIG. 22B shows that the area where the reaching motion was performed from the middle position between the self upper limb and the other person's upper limb is well consistent with the self-other blending feeling occurrence range. This means that the present experiment successfully quantified the self-other blending feeling of the motions. It is further understood that when a ratio of the self view presentation time is large, the reaching motion was performed from the position of the self upper limb position, and when a ratio of the other person's view presentation time is large, the reaching motion was performed from the position of the other person's upper limb position. This shows that the upper limb in the view presented for longer time tends to be integrated with the somatosensory information and motion command information of his/her own. It is further shown that, when the presentation time ratio of the self and other views is not biased to one of them and the switching cycle is large to some extent, the case of the reaching motion performed from the self upper limb position and the case of the reaching motion from the other person's upper limb position were mixed. This is because the presentation time for each view is long enough for the observation of the motion and for a determination of the self upper limb position at its correct position.

<Experiment V>

When mutual following motions are per formed in the state of the view time-dividing state of Experiment II, the self-other upper limb motions are coupled by perceiving the apparent movement between the self motion and the other person's motion, whereby the examinee perceived it as a continuous one motion. Such perceptive continuity of the motions may expand the consistency between sense and motions for the other person's upper limb as well, to generate the self-other blending feeling. Then, another experiment was performed to examine whether the examinee perceives the apparent movement between the self motion and the other person's motion, or to examine whether the range of perceiving this apparent movement agrees with the range of generating the self-other blending feeling.

The experimental environment was configured as follows. The examinee observed his/her upper limb motion via the HMD 1 fixed at the table. The number of examinees was four. Visual stimulus conditions presented at the HMD 1 included the condition to present an image of his/her hand in real time and the condition to present an ellipsoidal image created by CG (Computer Graphics). The ellipsoidal image was adjusted to have similar size and color to those of the hand image. Under each condition, the actual right hand of an examinee was placed at the position on the right at 2.5° from the center of the screen. His/her own hand or an ellipse was presented as a self image at the actual position of the right hand of the examinee, and a copy image of his/her own hand or an elipsoidal image was presented as the other person's image at the position on the left of the actual position of the right: hand of the examinee that was away by 5°.

In Experiment V, the presentation time of the self view image was X and the presentation time of the other person's image was Y, which were presented alternately by switching at a fixed cycle (=X+Y) and the presentation time ratio (=X:Y). Presentation was performed by fixing the self-other view switching cycle while changing the presentation time ratio of the self-other views (see FIG. 8(1) to (5)), or by fixing the presentation time ratio of the self-other views while changing the self-other view switching cycle (see FIG. 8(6) to (10)), each of which was performed four times. For two times among them, the state of presenting the self view longer was changed to the state of presenting the other person's view longer, and for the remaining two times, the state of presenting the other person's view longer was changed to the state of presenting the self view longer. The number of times of experiment for one examinee was the video switching 10 conditions×visual stimulus 2 conditions (hand image and ellipsoidal image)×repeated 4 times. The examinees were asked to answer from two options forcibly as to whether the apparent movement was perceived or not at the moment of switching of the two visual targets being viewed under the presented self-other view switching cycle and the self-other presentation time ratio conditions. This experiment shows that the examinees easily perceive the apparent movement of his/her own hand image better than of the ellipsoidal image. Next, a heat map about the ratio of the apparent movement perception was created when the visual target was the own hand image, and comparison was made with the heat map of the self-other blending feeling of FIG. 22B.

Figure 23:
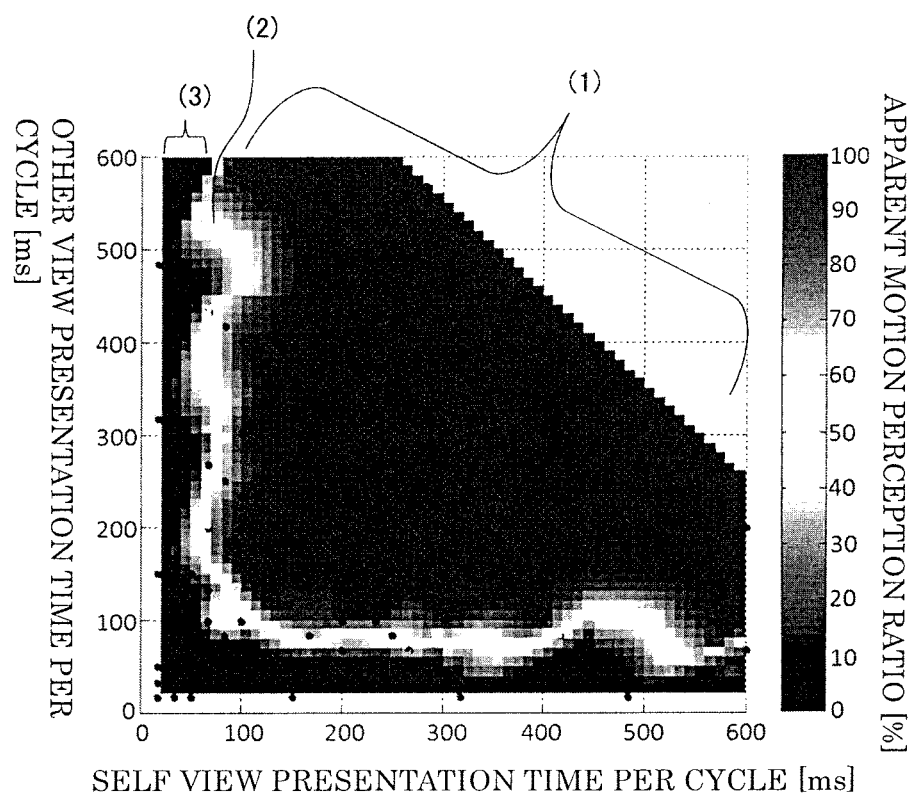
FIG. 23 is a heat chart diagram showing the perception ratio [%] of the apparent motion perception based on time parameters, where the horizontal axis represents the self view presentation time, and the vertical axis represents the other person's view presentation time.

FIG. 23 is a heat chart diagram showing the perception ratio [%] of the apparent motion perception based or time parameters, where the horizontal axis represents the self view presentation time, and the vertical axis represents the other person's view presentation time. Black dots in the chart show measurement positions, and interpolation is performed at the other parts. In FIG. 23, the area (1) has a high perception ratio (generally 80% to 90% or more), the area (3) has a low perception ratio (generally 30% or less) and the narrow area (2) therebetween has an intermediate level of perception ratio.

Based on FIG. 23 and FIG. 22B, the following considers the relationship between the perception ratio of apparent motion and the self-other blending feeling. In FIG. 22B, the reaching motion starting point is away from the visual target (T) by 30 mm in the x axis direction. It can be understood that, when the self-other view presentation ratio is biased greatly to one of the self and other views, the reaching motion performed becomes larger than 30 mm. This can be because the examinees performed the motion with certainty from the self upper limb position when the self view presentation ratio was large, and performed the motion with certainty from the other person's limb position when the other person's view presentation ratio was large. That is, irrespective of true or false, when self-other discrimination is performed enough, the reaching motion tends to overshoot the visual target (T). The areas of the view presentation condition where such a reaching motion with certainty was performed in FIG. 22B and of the view presentation condition with low perception ratio of the apparent motion in FIG. 23 substantially agree. It can be considered that perception of the apparent motion can suppress the reaching motion with certainty. This can be explained by the aforementioned VISS. That is, under the condition of not perceiving an apparent motion, examinees will feel so that the self upper limb motion and the other person's upper limb motion are presented at the same time as in the view synthesis condition (segregation of the self-other motions). When the view presentation time of one of them is too short, examinees will feel as if the view presented for a longer time only was presented, and in this case also, they can perform motions with certainty. On the other hand, under the view presentation condition of perceiving an apparent motion between the self-other upper limbs, examinee perceive the self upper limb motion and the other person's upper limb motion as one consecutive motion, and so have difficulty in separating the self and other person's motions. As a result of this, the area of perceiving the apparent motion between the self-other upper limbs includes the area of performing the reaching motion with less certainty, the area where the reaching motion may be performed from any of the self upper limb position and the other person's upper limb position and the area of the self-other blending feeling, i.e., placing the self upper limb at the middle position of the self upper limb and the other person's upper limb. In this way, perception of the self-other blending feeling would require the examinee having difficulty in self-other separation because of the apparent movement perception of the self-other upper limbs. Since the consistent self upper limb motion is jointed due to the apparent motion, such consistency with somatosensory information and motion command information would be expanded to the other person's motion as well.

<Experiment VI>

A phenomenon was found such that, in the following motion while being presented with the views in a time-dividing manner generating the self-other blending feeling, the examinees can follow the other person's motion irrespective of the difficulty in discrimination of the self and other hands. In the view time-dividing method, such ability of following motion while having the difficulty in discrimination of the self and other suggests an unconscious following motion control system that does not depend on the conscious self-other discrimination. Then, examinees may drive this following motion control system to agree the two-persons' motions physically, thus achieving the consistency between sense and motions during the continuous duration for the self and other person's upper limbs, i.e., the self-other blending feeling. The following examines the following motion accuracy and its strategy to confirm the physical synchronization of the two persons' motions, and compares the time parameter area where the following accuracy is held and the area where the self-other blending feeling occurs to consider influences that the physical synchronization of the two persons' motions gives the self-other blending feeling.

The environment for "pre-experiment" to be performed prior to Experiment VI was configured as follows. Examinees were asked to observe his/her upper limb motions for 40 seconds through the HMD 1 fixed at the table. Display modes to in this pre-experiment included:

Presentation of other person's view only (view exchange);

Presentation of self-other views in a brightness superimposed manner (view synthesis);

Presentation of self-other views in a time-dividing manner (cycle of 400 milliseconds, self-other view presenting time ratio of 2:1);

Presentation of self-other views: in a time-dividing manner (cycle of 400 milliseconds, self-other view presenting time ratio of 1:1); and Presentation of self-other views in a time-dividing manner (cycle of 400 milliseconds, self-other view presenting time ratio of 1:2).

Each display mode was performed five times. The examinees were instructed to perform an upper limb motion to keep his/her index finger positions at the other person's index finger positions precisely. The observed upper limb motion, i.e., the position of the upper limb was analyzed at predetermined time intervals, e.g., every 10 ms. The result shows that the unconscious following motion control system was driven in the state of the view time-dividing presentation. However, under the visual presentation condition making it difficult in self-other separation, it is not clear based on what information this unconscious following motion control system achieves the following motion.

Then, visual information to drive the unconscious following motion control system was observed in this Experiment VI. Specifically temporal transitions of position following gain and velocity following gain were found for the following motion data under the view time-dividing presentation condition. This enables the observation as to when each following gain is changed for the given information. If a specific timing in the view time-dividing presentation drives the unconscious following motion control system, following gains at such timing are collected for averaging, whereby a characteristic variation of the gain can be found. For instance, at the moment when the view is switched from the self view to the other person's view or from the other person's view to the self view, the position following gain would increase because of a positional error of the two upper limbs (self and other person's upper limbs). The results as stated above clarified that, when the self view presentation ratio increases in the self-other view presentation, the position following accuracy and the velocity following accuracy deteriorate even at the fixed view switching cycle. The experimental environment was the same as in the pre-experiment, and analysis was made for the following motion data under the three conditions in the view time-dividing presentation.

Figure 24A:
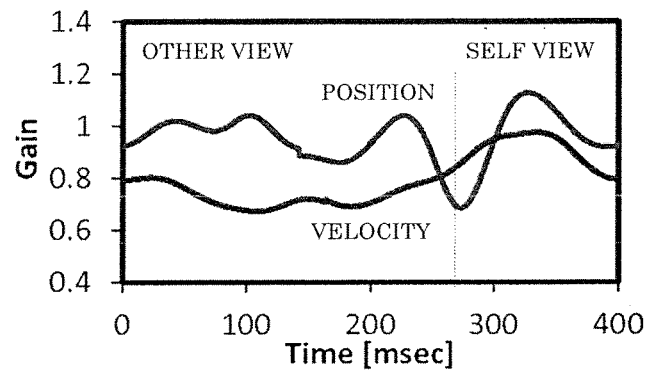
FIG. 24A shows the case where the cycle was 400 milliseconds and the to self-other view presenting time ratio was 1:2.
Figure 24B:
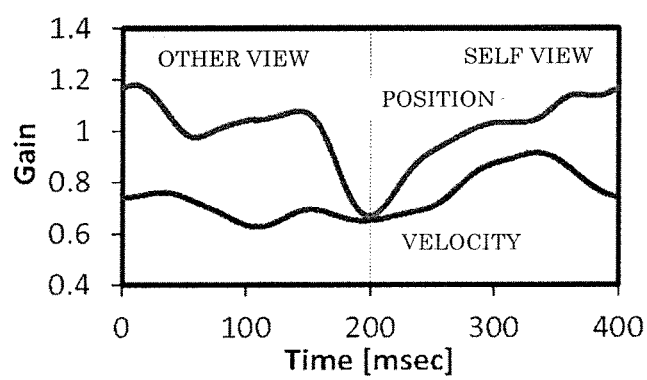
FIG. 24B shows the case where the cycle was 400 milliseconds and the self-other view presenting time ratio was 1:1.
Figure 24C:
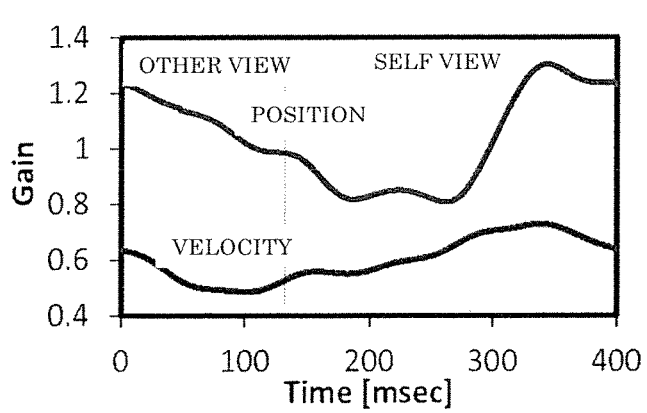
FIG. 24C shows the case where the cycle was 400 milliseconds and the self-other view presenting time ratio was 2:1.

FIG. 24 illustrates the relationship between the three conditions for view time-dividing presentation and the following gains obtained as a result of the analysis, where FIG. 24A shows the case where the cycle was 400 milliseconds and the self-other view presenting time ratio was 1:2, FIG. 24B shows the case where the cycle was 400 milliseconds and the self-other view presenting time ratio was 1:1, and FIG. 24C shows the case where the cycle was 400 milliseconds, and the self-other view presenting time ratio was 2:1. The gains are values obtained by frequency-analyzing of the measurement data, rewriting the expression into a differential equation to find arm actual time response, and approximating the same.

FIG. 24 illustrates the view states (self view duration or other person's view duration) presented at that time as well in a superimposed manner. FIG. 24A, 24B has characteristics such that, at the moment when the other person's view was changed to the self view, a great decrease in the position following gain was observed. In FIG. 24C, such a decrease in the position following gain was not observed at the moment when the other person's view was changed to the self view. Then, at the moment when the self view was changed to the other person's view (the moment returning from 400 ms to 0 ms), any characteristic waveform was not found. Meanwhile, the three conditions had a similar waveform for the velocity following gain. Herein, the velocity following gain waveform for these three conditions are similar to the case where the presentation starting timing of the other person's view was set at 0 ms. When the presentation starting timing of the self view was set at 0 ms, such a similarity will lose. As the presentation time of the other person's view decreases, the amplitude of the velocity following gain decreases.

Firstly as for the position following gain, a decrease in the position following gain at the switching moment from the other person's view to the self view was observed under the conditions of the self-other view presenting time ratio of 1:2 and 1:1, but was not observed under the condition of the self-other view presenting time ratio of 2:1. Herein, referring to the result of the pre-experiment, the condition of the self-other view presenting time ratio of 2:1 significantly deteriorates in position following accuracy as compared with the conditions of 1:2 and 1:1. Then, when the self-other view presenting time ratio was 1:2, the position following ability was the best. This shows that such a decrease in the position following gain at the switching moment from the other person's view to the self view can be a necessary strategy to hold the position following accuracy. This means that information given at the switching moment from the other person's view to the self view will be an interfering factor for the following motion. On the other hand, no decrease in the position following gain was observed at the switching moment from the self view to the other person's view.

Herein, as illustrated in FIG. 22B as above, if the self upper limb and the other person's upper limb cannot be separated, Information obtained at the switching timing from the self view to the other person's view and information obtained at the switching moment from the other person's view to self view will be equivalent. What is obtained at these moments would be a positional displacement on the retina between the self upper limb and the other person's upper limb. In spite of this, the symmetry is lost in this case. This means the possibility that the self-other separation cannot be performed consciously, but the self-other discrimination can be performed in the control system to perform the unconscious position following motion. This further shows that polarity between the two upper limbs, i.e., the direction from the self upper limb to the other person's upper limb, and the direction from the other person's upper limb to the self upper limb are used for the following.

According to the result of this Experiment VI, it appears that the direction from the other person's upper limb to the self upper limb, i.e., the direction away from the other person's upper limb is avoided. This can have a close relationship with the apparent motion perception as stated above. Perception of the apparent motion between the two upper limbs brings the direction between the two upper limbs. If this apparent motion is used for following, they can move the self upper limb to the other person's upper limb by using the apparent motion at the switching moment from the self view to the other person's view. However, the apparent motion at the switching moment from the other person's view to the self view is the direction away from the other person's upper limb, such an apparent motion used for the following will fail in decreasing the error. In this way, the result suggests that the apparent motion information is used or the following motion under the view time-dividing presentation condition.

Figure 25:
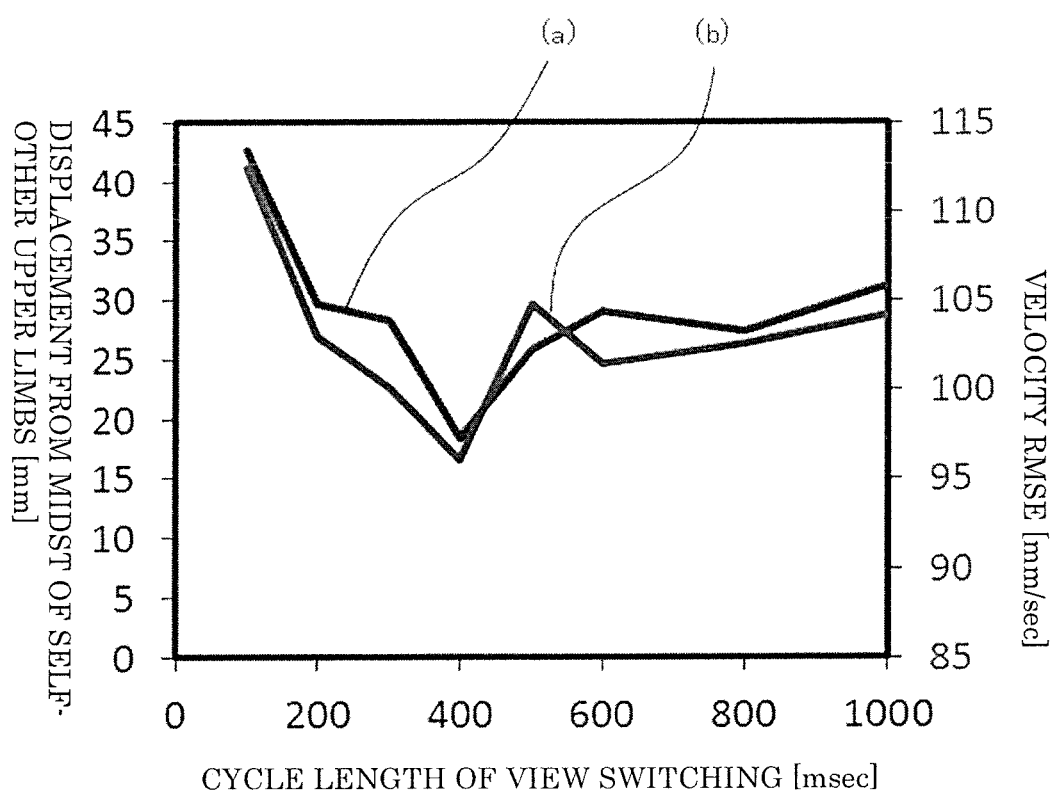
FIG. 25 illustrates the characteristics of the generation of the self-other blending feeling and the other person's motion following accuracy characteristics in the view time-dividing presentation.

FIG. 25 illustrates the characteristics of the generation of the self-other blending feeling and the other person's motion following accuracy characteristics in the view time-dividing presentation. FIG. 25 shows, when the cycle of the view time-dividing presentation was changed, the measurement data of the self-other blending feeling characteristics (a) and the other person's motion following accuracy characteristics (b) for each cycle. The self-other blending feeling is a displacement from the middle point of the self and other upper limbs (it increases as the self upper limb position is closer to 0), and the other person's motion following accuracy is velocity RMSE. This shows that the other person's motion following ability and the self-other blending feeling are high at around the cycle of 400 ms.

Figure 26:
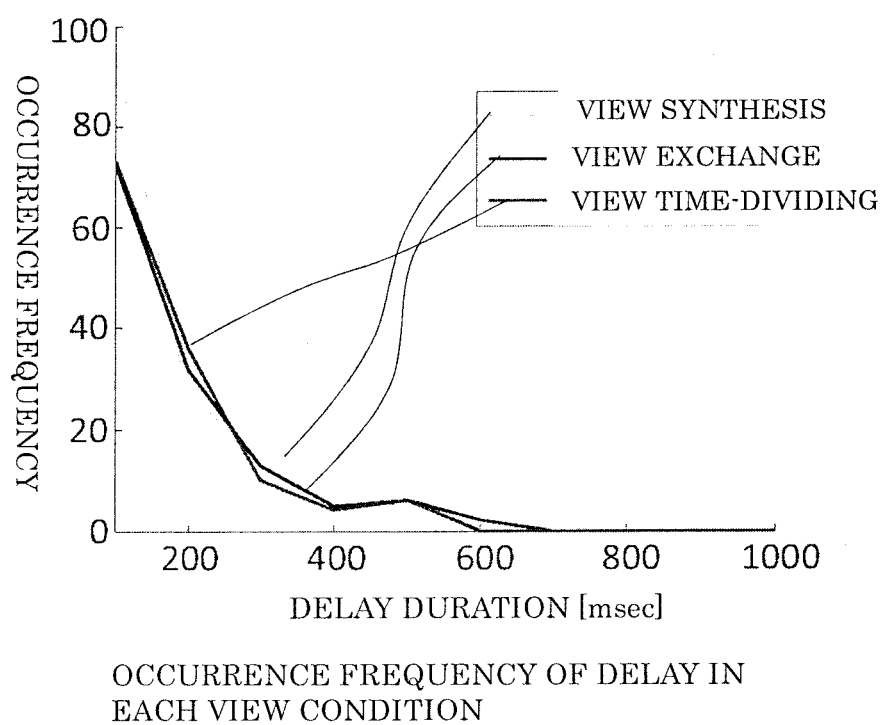
FIG. 26 illustrates the relationship of delay (pause in the motion) and its frequency in the other person's motion following experiment in each display mode.

FIG. 26 illustrates the relationship of delay (pause in the motion) and its frequency in the other person's motion following experiment in each display mode. The measurement data of FIG. 26 is created based on the results of Experiment VI. Since the average movement velocity of the other person's motion was 72.9 mm/sec, if the average motion speed for 0.1 to 1.0 second was 20 mm/sec or less, the motion was determined as pause. According to FIG. 26, the view synthesis state included many delay at about 100 ms and at about 400 ms. On the other hand, delay occurred at the same level of frequency between the view exchange state and the view time-dividing state, and their levels were low. That is, in the view exchange state and the view time-dividing state, it seems that they moved their hands more smoothly than in the view synthesis state. Histograms of the delay represent this phenomenon quantitatively.

<Experiment VII>

In the above Experiment VI, it is considered that the apparent motion information is used for the following motion. The apparent motion requires, when a plurality of characteristic points exist, determination of the matching between these characteristic points. This process typically is not performed consciously, and so this can be unconscious process. Under the view synthesis presentation condition, if there are many characteristic points to be related, attention has to be shifted between the two upper limbs in a complicated manner. On the other hand, if the apparent motion information is used for the following motion under the view time-dividing presentation condition, following motion with fewer burdens on the attention can be performed by matching the characteristic points unconsciously.

In Experiment VII, following accuracy was confirmed for the following motion task that requires a large number of characteristic points to be related. Experiment VII was performed under the experimental condition similar to that of Experiment IV. However, the magnetic sensors 141 were attached to tip ends of all five fingers of the right hand, and position data of each of the five fingers was measured during the bending as and stretching motions. In this experiment, the following motion of the five fingers of the right hand was performed. As the other person's motion, a recorded image of five fingers in the bending and stretching motions at random without moving the back of the hand fixed on the table for 15 seconds was prepared. The examinee was asked to synchronize each of his/her five fingers with the five-finger motion of the other person by the same procedure as that of the pre-experiment in the presented visual conditions. Then, the position RMSE and the velocity RMSE were calculated with reference to the other person's motion for each of the five fingers. Then the averages of the position RMSE and the velocity RMSE of the five fingers were found. Further each of the position RMSE and the velocity RMSE to corresponding to ten times were averaged.

FIG. 27 includes charts showing the following error of the five-finger random bending and stretching motion in each display mode, where FIG. 27A shows the position RMSE, and FIG. 27B shows the velocity RMSE. The conditions of the view time-dividing presentation included three conditions of the self-other view presentation ratio of 1:2, 1:1 and 2:1. Although the position RMSE of FIG. 27A does not show a significant difference among the view time-dividing presentation condition, the view synthesis condition and the view exchange condition, the velocity RMSE of FIG. 27B shows almost the same level for the three conditions of the view time-dividing presentation, which was smaller than in the view synthesis presentation and the view exchange.

<Experiment VIII>

Experiment VIII was conducted to examine the influences of the time parameters on the following accuracy in the view time-dividing presentation, and compare the result with the heat map of the self-other blending feeling of FIG. 22B. Experiment VIII was performed under the experimental environment similar to that of Experiment IV. The experiment was performed, similarly to the pre-experiment of Experiment VI, with a recorded image as the other person's motion in which upper limb motion was performed at random on the x-y plane for 15 seconds.

The experiment was performed for the self view presentation, the view exchange presentation and the view synthesis presentation as well as the self-other view time-dividing presentation as follows, each of which was no performed at random ten times:

self-other view time-dividing presentation (cycle of 100 milliseconds, self-other view presenting time ratio of 1:1);
self-other view time-dividing presentation (cycle of 200 milliseconds, self-other view presenting time ratio of 1:1);
self-other view time-dividing presentation (cycle of 300 milliseconds, self-other view presenting time ratio of 1:2);
self-other view time-dividing presentation (cycle of 300 milliseconds, self-other view presenting time ratio of 1:1);
self-other view time-dividing presentation (cycle of 300 milliseconds, self-other view presenting time ratio of 2:1);
self-other view time-dividing presentation (cycle of 400 milliseconds, self-other view presenting time ratio of 1:5);
self-other view time-dividing presentation (cycle of 400 milliseconds, self-other view presenting time ratio of 1:2);
self-other view time-dividing presentation (cycle of 400 milliseconds, self-other view presenting time ratio of 1:1);
self-other view time-dividing presentation (cycle of 400 milliseconds, self-other view presenting time ratio of 2:1);
self-other view time-dividing presentation (cycle of 500 milliseconds, self-other view presenting time ratio of 1:3);
self-other view time-dividing presentation (cycle of 500 milliseconds, self-other view presenting time ratio of 1:2);
self-other view time-dividing presentation (cycle of 500 milliseconds, self-other view presenting time ratio of 1:1);
self-other view time-dividing presentation (cycle of 500 milliseconds, self-other view presenting time ratio of 2:1);
self-other view time-dividing presentation (cycle of 500 milliseconds, self-other view presenting time ratio of 3:1);
self-other view time-dividing presentation (cycle of 600 milliseconds, self-other view presenting time ratio of 1:3);
self-other view time-dividing presentation (cycle of 600 milliseconds, self-other view presenting time ratio of 1:1);
self-other view time-dividing presentation (cycle of 700 milliseconds, self-other view presenting time ratio of 3:1);
self-other view time-dividing presentation (cycle of 800 milliseconds, self-other view presenting time ratio of 1:2);
self-other view time-dividing presentation (cycle of 800 milliseconds, self-other view presenting time ratio of 1:1);
self-other view time-dividing presentation (cycle of 800 milliseconds, self-other view presenting time ratio of 2:1); and
self-other view time-dividing presentation (cycle of 1,000 milliseconds, self-other view presenting time ratio of 1:1).

Figure 28:
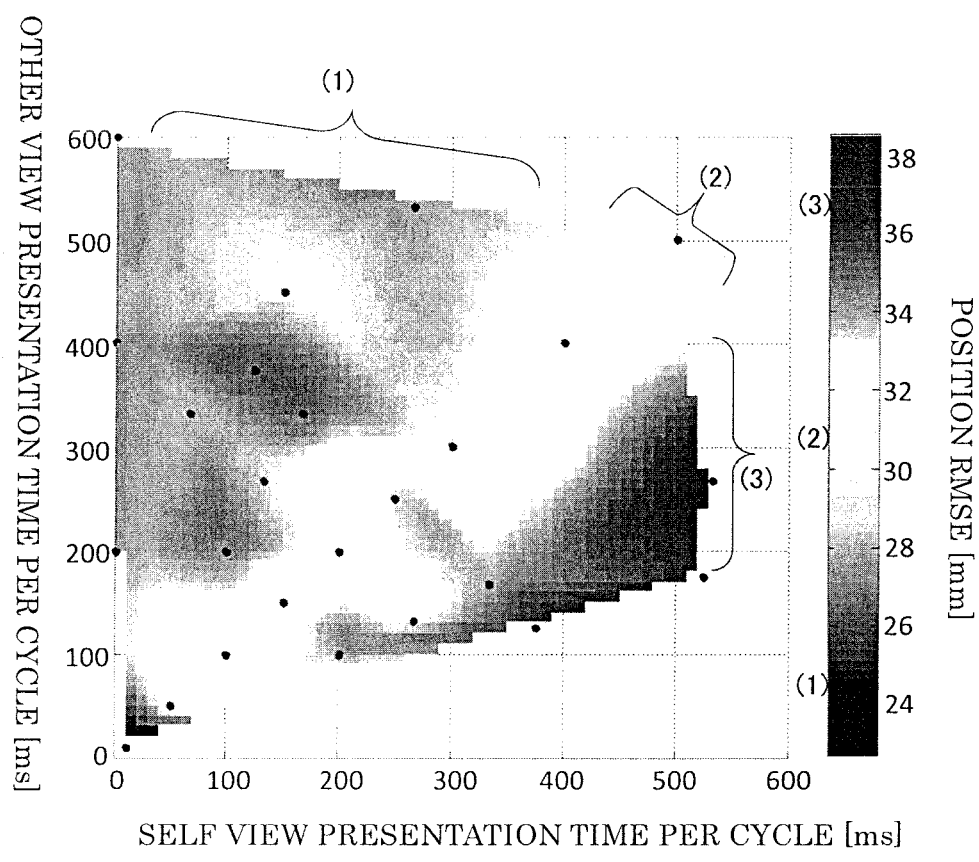
FIG. 28 is a heat map chart showing the following position error versus time parameters.
Figure 29:
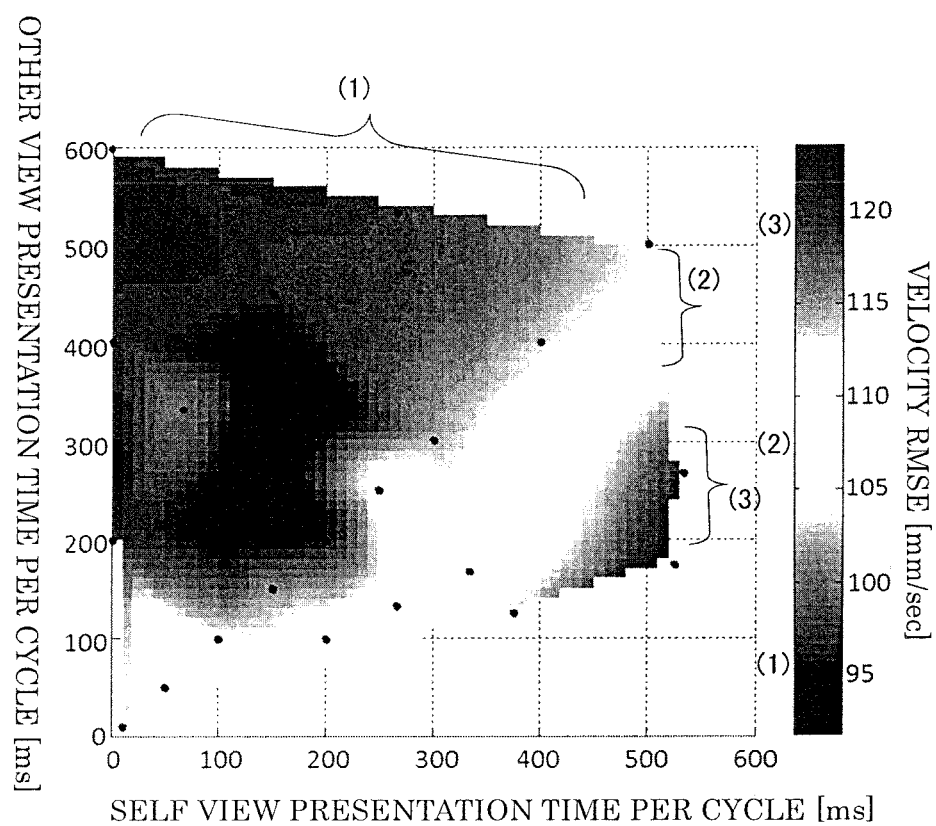
FIG. 29 is a heat map chart showing the following velocity error versus time parameters.

FIG. 28 is a heat map chart showing the following position error versus time parameters, and FIG. 29 is a heat map chart showing the following velocity error versus time parameters. At parts other than the measurement points, interpolation is performed. The part of the self view presentation condition was removed for easy understanding of a change in the following accuracy. In these charts, the position RMSE (as well as the velocity RMSE) was small at the area (1), at an intermediate level at the area (2) and was large at the area (3). As can be seen, the area (1) with small position RMSE and velocity RMSE was the range of the cycle of about 200 to 500 ms and the self-other view presentation ratio of 1:3 to 1:1.

As can be seen from FIG. 28, the position following RMSE was small under the view synthesis condition (the presentation time of the self view and the other person's view both was 0 ms) as well as at the area where the self view presentation time was 100 to 200 ms and the other person's view presentation time was 200 to 400 ms. Similarly, as can be seen from FIG. 29 as well, the position following RMSE was the smallest at the area where the self view presentation time was 100 to 200 ms and the other person's view presentation time was 200 to 400 ms.

For comparison with the self-other blending feeling, a comparison between FIG. 22B and FIG. 29 is considered. Both are common in that it is at a small level at the area where the self view presentation time was 100 to 200 ms and the other person's view presentation time was 200 to 300 ms.

The relationship between the presentation time parameters for the view time-dividing and the following accuracy is firstly considered. As the self view presentation time ratio increases, the position RMSE and the velocity RMSE increase. This can be because the time to obtain the other person's motion information required for the following motion is less, and so sufficient following accuracy cannot be held. Then as the other person's view presentation time ratio increases, the position RMSE and the velocity RMSE decrease. At the area where the examinee feels two person's hands presented at the same time (self view presentation time of 0 to 150 ms and other person's view presentation time of 0 to 150 ms as in the view synthesis condition, the position RMSE tends to decrease and the velocity RMSE tends to increase. Since the following accuracy of the two person's motions increase physically, similarity between the self motion and the other person's motion increases. As a result, sense-motions consistency can be easily obtained over the continuous time for the self motion as well as the other person's motion.

The present invention may be the following embodiments.

(1) When the following motion is performed with a device having the cycle and the ratio set that are obtained by Experiment II, a reference image as a following target may be obtained from another device via the communication unit 25, or may be stored beforehand as a recorded image in the reference image storage unit 231, which may be fetched as needed.

(2) The present invention is not limited to time-dividing display of images taken by the self and the other person's cameras, and may be an embodiment such that markers or the like in the required number are attached to required parts of a physical part, images of these markers are taken by imaging means during the mot: ion of the physical part, and the image may be displayed at a display unit, including the markers as bright spots or as skeletal animation.

(3) The present invention may be an embodiment such that parameters in the range set: by Experiment II are set at the display mode setting unit 213 in a fixed manner, or may be an embodiment having versatility so that the range of generating the blending feeling, the range of inducing a motion and the range of high following accuracy can be adjusted finely.

(4) The present invention may include a display unit as follows. For instance, a camera (imaging unit) and a display unit may be separated. That is, the camera may be attached to a human body or the like to obtain an image from a first person perspective and the display unit may include a panel-form display that can be disposed away from a human body or include an image projector such as a liquid crystal projector and a screen. The camera may be configured so that the wearer does not wear the camera at the head (above the neck) but the camera is disposed at a position on the perspective of the human body and away from the head forward or backward. This also enables an image from a first person perspective to be obtained, and enables an image of a part to be imaged of the wearer's body to be obtained effectively.

(5) Tin the case of a motion guide display system including two motion guide display devices, time-dividing display may be of a cooperative type, i.e., a reference image in a following mode is guided to two of them, thus letting both of them perform following motions, or letting one of them on the operator side only perform a following motion. This may be of a selectable mode for the setting.

(6) The present embodiment describes a VST-HMD, which may be an optical see-through type HMD instead. The optical see-through HMD may the configured as follows, for example. Referring to FIG. 1 for comparison, the optical see-through type HMD has to be configured so that the wearer wearing the frame member 10 as illustrated in FIG. 1 is allowed to see the (actual) view optically in front of him/her. Then the image display device 11 may be disposed at a lateral position avoiding the front side of the frame member 10. In front of the frame member 10 is disposed a half mirror instead of the image display device 11, in front of which is further disposed a shutter including a liquid crystal panel or the like. The half mirror is disposed obliquely, and the image display device 11 is disposed on the optical axis separated, i.e., bent by the half mirror. As a result, in the state of shutter OFF (open) (the image display device is OFF), the front natural view (e.g., the motion of the wearer's wrist) is presented via the half mirror, and in the state of shutter ON (close), the image display device 11 is driven to present the reference image reflected from the half mirror. Such a display motion, i.e., ON/OFF switching motion of the shutter and the intermediate driving operation of the image display device 11 are synchronized, and are executed repeatedly within the aforementioned cycle and ratio, whereby time-dividing display similar to the VST-HMD 1 is enabled, whereby the blending feeling can be generated. In the motion guide display system including the two motion guide display devices of the above (5), one of them may be the VST-HMD 1, and the other may be the optical see-thorough type HMD. In this case, the VST-HMD 1 side may be a reference image side and the optical see-through type HMD side may be a follower side.

(7) The VST-HMD as one example of the presentation member according to the present invention is not limited to a head-mounted type, but may be an eyeglass type that is mounted on the face at a part of the face, the ears and the nose.

As described above, this motion guide presentation method presents a reference image as a following target as well as a self image of a user at a presentation member, and guides the user to follow a motion in the reference image. The reference image and the self Image both from a first person perspective are preferably presented alternately in a time-dividing manner at the presentation member under a predetermined condition, the predetermined condition including a frequency of the time-dividing presentation and a ratio of presentation time between the self image and the reference image.

This motion guide presentation device preferably includes: a common present at ion member that presents a reference image as a following target as well as a self image of a user both from a first person perspective; presentation processing unit that configures to present the reference image and the self image alternately in a time-dividing manner at the presentation member under a predetermined condition; and presentation mode setting unit that configures to let the presentation processing unit operate at a frequency of the time-dividing presentation and a ratio of presentation time between the self image and the reference image as the predetermined condition.

With these configurations, the self image from a first person perspective and the reference image as a following target from a first person perspective are presented alternately in a time-dividing manner at the common presentation member. The time-dividing presentation is performed at a predetermined frequency and a predetermined ratio, which can achieve precise following ability compared with the view synthesis method and the view exchange method. The following ability includes a decrease in the following velocity error and the following position error. When two persons including another person as the reference image (in the case of a recorded image, this includes an image of the other person as well as the user) and the user perform a cooperative physical motion, the reference image and the self image are switched under the predetermined condition, whereby the user does not lose the voluntariness of the self motion and performs a motion naturally to follow the other person's motion, i.e., the user can feel the illusion as if physical parts of the two persons that are displayed successively in the view were blended into the one and self motion part, (generation of the blend feeling). As a result, the user can execute simultaneous matching of multiple corresponding points unintentionally, which is difficult to execute intentionally, and so can continue the following motion spontaneously while reducing a burden of cognition on the behavior.

The predetermined condition preferably includes the ratio of presentation time of the reference image to the self image that is at least 1 or more. This can bring the impression of the motion direction from the image that is presented for a shorter time to the image that is presented for a longer time, and so can induce the motion. In this way, setting the duration of the reference image at the same or relatively longer time (exceeding 1) can facilitate the induction to the motion of the reference image, i.e., can facilitate the natural following motion.

The predetermined condition of the present invention preferably includes the frequency of the time-dividing presentation that is about 2 Hz to 4 Hz, and the ratio of presentation time between the self image and the reference image that in 1:1 to 1:3. This can bring the blending feeling, and so can achieve higher following accuracy.

The predetermined condition preferably includes the ratio of presentation time between the self image and the reference image that is about 1:2. This can maximize the following accuracy substantially.

The predetermined condition preferably includes the frequency of the time-dividing presentation that is about 2.5 Hz. This can bring the blending feeling, and so can maximize higher following accuracy substantially.

The self image preferably is an image from a first person perspective that is taken by an imaging member. In this case, the motion guide presentation device preferrably includes an imaging unit that takes the self image from a first person perspective, and the presentation processing unit guides the self image taken to the common presentation member. This allows the self image taken from a first person perspective and the reference image to be presented alternately in a time-dividing manner. Since the image is a taken image, the self image can be transmitted to the other person's side as well, and so the applicability thereof can be unproved.

This motion guide presentation system preferably includes a first and a second motion guide presentation devices as the motion guide presentation device, and a communication unit to perform transmission and reception of images taken mutually between the first and the second motion guide presentation devices. This can provide a very effective remote cooperation supporting system that brings the blending feeling in real time, and can facilitate the induction of natural following motion. This can be applied to the embodiment configured so that both sides follow images taken by both sides as reference images to have a cooperative relationship.

REFERENCE SIGNS LIST

1 VST-HMD (presentation member)
2 processing device
11 image display device
13 camera (imaging unit)
21 controller
212 image display processing unit (presentation processing means)
213 display mode setting unit (presentation mode setting means)
214 communication processing unit
25 communication unit
231 reference image storage unit
24 manipulation unit (adjustment unit)
3 analyzer

The invention claimed is:

1. A motion guide presentation method that presents a reference image as a following target as well as a self image of a user at a presentation member, and guides the user to follow a motion in the reference image,
   wherein the reference image and the self image both from a first person perspective are presented alternately in a time-dividing manner at the presentation member under a predetermined condition;
   wherein the predetermined condition includes a frequency of the time-dividing presentation and a ratio of presentation time between the self image and the reference image;
   wherein the predetermined condition includes the frequency of the time-dividing presentation that is about 2 Hz to 4 Hz; and
   wherein the predetermined condition includes the ratio of presentation time between the self image and the reference image that is 1:1 to 1:3.

2. The motion guide presentation method according to claim 1, wherein the predetermined condition includes the ratio of presentation time between the self image and the reference image that is about 1:2.

3. The motion guide presentation method according to claim 1, wherein the predetermined condition includes the frequency of the time-dividing presentation that is about 2.5 Hz.

4. The motion guide presentation method according to claim 1, wherein the self image is an image from a first person perspective that is taken by an imaging member.

5. A motion guide presentation device, comprising:
   a common presentation member that presents a reference image as a following target as well as a self image of a user both from a first person perspective;
   a presentation processing unit that configures to present the reference image and the self image alternately in a time-dividing manner at the presentation member under a predetermined condition; and
   a presentation mode setting unit that configures to let the presentation processing unit operate at a frequency of the time-dividing presentation and a ratio of presentation time between the self image and the reference image as the predetermined condition, wherein the presentation mode setting unit sets, as the predetermined condition, the frequency of the time-dividing presentation at about 2 Hz to 4 Hz, and the ratio of presentation time between the self image and the reference image at 1:1 to 1:3.

6. The motion guide presentation device according to claim 5, wherein the presentation mode setting unit sets the ratio of presentation time between the self image and the reference image at about 1:2.

7. The motion guide presentation device according to claim 5, wherein the predetermined condition includes the frequency of the time-dividing presentation that is about 2.5 Hz.

8. The motion guide presentation device according to claim 5, further comprising an imaging unit that takes the self image from a first person perspective, wherein the presentation processing unit guides the self image taken to the common presentation member.

9. A motion guide presentation system, comprising:
   a first and a second motion guide presentation devices as the motion guide presentation device according to claim 8; and a communication unit to perform transmission and reception of images taken mutually between the first and the second motion guide presentation devices.

\* \* \* \* \*